US012210562B2

(12) United States Patent
Sharifi

(10) Patent No.: US 12,210,562 B2
(45) Date of Patent: Jan. 28, 2025

(54) MEDIA CONSUMPTION HISTORY

(71) Applicant: GOOGLE LLC, Mountain View, CA (US)

(72) Inventor: Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/376,735

(22) Filed: Oct. 4, 2023

(65) Prior Publication Data
US 2024/0037137 A1     Feb. 1, 2024

Related U.S. Application Data

(60) Continuation of application No. 16/393,029, filed on Apr. 24, 2019, now Pat. No. 11,816,141, which is a
(Continued)

(51) Int. Cl.
*G06F 16/00*     (2019.01)
*G06F 16/245*     (2019.01)
(Continued)

(52) U.S. Cl.
CPC .......... *G06F 16/487* (2019.01); *G06F 16/245* (2019.01); *G06F 16/2455* (2019.01);
(Continued)

(58) Field of Classification Search
CPC .. G06F 16/487; G06F 16/245; G06F 16/2455; G06F 16/24578; G06F 16/433;
(Continued)

(56) References Cited

U.S. PATENT DOCUMENTS 6,791,580 B1    9/2004   Abbott et al.
7,181,444 B2    2/2007   Porter et al.
(Continued)

OTHER PUBLICATIONS

Feng et al., "Speech and Multimodal Interaction in Mobile Search," IEEE Signal Processing Magazine, IEEE 1-21 NJ, US, Service Center, Piscataway, vol. 28, No. 4; pp. 40-49; dated Jul. 1, 2011.
(Continued)

*Primary Examiner* — Paul Kim
(74) *Attorney, Agent, or Firm* — Gray Ice Higdon

(57) ABSTRACT

Methods, systems, and apparatus for receiving a request that includes a user identifier of a user that submitted a search query and an entity identifier of an entity that is referenced by the search query, identifying a plurality of knowledge elements that are related to the entity, identifying, in a consumption database, one or more items that have been indicated as consumed by the user and that are associated with the entity that is referenced by the search query, assigning rank scores to the plurality of knowledge elements, based at least on identifying the one or more items, selecting one or more of the knowledge elements from among the knowledge elements based at least on the rank scores assigned to the knowledge elements, and providing, in response to the request, information associated with the entity and the one or more selected knowledge elements.

20 Claims, 9 Drawing Sheets

Related U.S. Application Data continuation of application No. 15/173,794, filed on Jun. 6, 2016, now Pat. No. 10,303,779, which is a division of application No. 14/133,791, filed on Dec. 19, 2013, now Pat. No. 10,275,464.

(60) Provisional application No. 61/866,234, filed on Aug. 15, 2013.

(51) Int. Cl.
| | |
|---|---|
| G06F 16/2455 | (2019.01) |
| G06F 16/2457 | (2019.01) |
| G06F 16/432 | (2019.01) |
| G06F 16/435 | (2019.01) |
| G06F 16/48 | (2019.01) |
| G06F 16/487 | (2019.01) |
| G06F 16/683 | (2019.01) |
| G06F 16/783 | (2019.01) |
| G06F 16/9535 | (2019.01) |
| G06F 16/955 | (2019.01) |
| G06Q 30/02 | (2023.01) |
| G06Q 30/0601 | (2023.01) |

(52) U.S. Cl.
CPC ...... *G06F 16/24578* (2019.01); *G06F 16/433* (2019.01); *G06F 16/435* (2019.01); *G06F 16/437* (2019.01); *G06F 16/489* (2019.01); *G06F 16/685* (2019.01); *G06F 16/7834* (2019.01); *G06F 16/9535* (2019.01); *G06F 16/955* (2019.01); *G06Q 30/02* (2013.01); *G06Q 30/0631* (2013.01)

(58) Field of Classification Search
CPC .... G06F 16/435; G06F 16/437; G06F 16/489; G06F 16/685; G06F 16/7834; G06F 16/9535; G06F 16/955; G06Q 30/02; G06Q 30/0631; G10L 25/54
See application file for complete search history.

(56) References Cited

U.S. PATENT DOCUMENTS

| | | | |
|---|---|---|---|
| 7,444,353 B1 | 10/2008 | Chen et al. | |
| 7,746,895 B2 | 6/2010 | Bucher et al. | |
| 7,937,403 B2 | 5/2011 | Kehl | |
| 8,180,765 B2 | 5/2012 | Nicolov | |
| 8,484,017 B1 | 7/2013 | Sharifi et al. | |
| 8,799,814 B1 | 8/2014 | Bryc et al. | |
| 8,954,448 B1 | 2/2015 | Durham et al. | |
| 9,110,954 B2 | 8/2015 | Shen et al. | |
| 10,198,442 B2 | 2/2019 | Sharifi | |
| 10,275,464 B2 | 4/2019 | Sharifi | |
| 10,303,779 B2 | 5/2019 | Sharifi | |
| 10,332,151 B2* | 6/2019 | Megdal | H04L 67/52 |
| 2003/0212659 A1 | 11/2003 | Ban | |
| 2005/0071323 A1 | 3/2005 | Gabriel et al. | |
| 2007/0192319 A1 | 8/2007 | Finley et al. | |
| 2007/0239675 A1 | 10/2007 | Ragno et al. | |
| 2008/0222105 A1* | 9/2008 | Matheny | G06F 16/9535 |
| 2008/0222295 A1 | 9/2008 | Robinson et al. | |
| 2008/0275846 A1 | 11/2008 | Almas | |
| 2009/0164641 A1 | 6/2009 | Rogers et al. | |
| 2010/0070488 A1 | 3/2010 | Sylvain | |
| 2010/0161643 A1 | 6/2010 | Gionis et al. | |
| 2010/0211575 A1 | 8/2010 | Collins et al. | |
| 2011/0153050 A1 | 6/2011 | Bauer et al. | |
| 2011/0276396 A1 | 11/2011 | Rathod | |
| 2011/0314039 A1* | 12/2011 | Zheleva | G06F 16/437 |
| | | | 703/2 |
| 2012/0059495 A1 | 3/2012 | Weiss et al. | |
| 2012/0059838 A1* | 3/2012 | Berntson | G06F 16/951 |
| | | | 707/E17.014 |
| 2012/0166432 A1 | 6/2012 | Tseng et al. | |
| 2013/0117259 A1 | 5/2013 | Ackerman | |
| 2013/0173604 A1* | 7/2013 | Li | G06F 16/9538 |
| | | | 707/723 |
| 2013/0212081 A1 | 8/2013 | Shenoy et al. | |
| 2013/0291025 A1 | 10/2013 | Ozawa et al. | |
| 2013/0325869 A1 | 12/2013 | Reiley et al. | |
| 2013/0326406 A1 | 12/2013 | Reiley et al. | |
| 2014/0095608 A1 | 4/2014 | Mandalia et al. | |
| 2014/0101142 A1 | 4/2014 | Gomez Uribe et al. | |
| 2014/0101192 A1 | 4/2014 | Sabah et al. | |
| 2014/0280112 A1* | 9/2014 | Cheng | G06Q 30/00 |
| | | | 707/728 |
| 2014/0280291 A1 | 9/2014 | Collins et al. | |
| 2015/0052168 A1 | 2/2015 | Sharifi | |
| 2015/0134334 A1 | 5/2015 | Sachidanandam et al. | |
| 2019/0251117 A1 | 8/2019 | Sharifi | |

OTHER PUBLICATIONS

Fink et al* "Social and interactive television applications based on real-time ambient-audio identification", Proceedings of the EuroITV 2006 Conference, pp. 138-146, ResearchGate.

International Preliminary Report on Patentability in International Application No. PCT/US2014/051126, 8 pages; mailed Feb. 25, 2016.

International Preliminary Report on Patentability in International Application No. PCT/US2014/051123, 8 pages; mailed Nov. 28, 2014.

International Search Report and Written Opinion in International Application No. PCT/US2014/051123, 11 pages; mailed Nov. 28, 2014.

Lee. "Analysis of User Needs and Information Features in Natural Language Queries Seeking Music Information," Journal of the American Society for Information Science and Techonology, 61(5), 42 pages; dated May 1, 2010.

Song et al. "Voice search of structured media data," ICASSP 2009, IEEE International Conference; 4 pages; dated Apr. 19, 2009.

TW Office Action in Taiwan Appln. No. 103127977, 12 pages; dated Jun. 13, 2019.

* cited by examiner

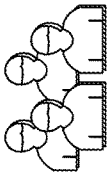

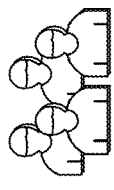

MEDIA CONSUMPTION HISTORY

TECHNICAL FIELD

This specification relates to processing search queries.

BACKGROUND

In general, a user can request information by inputting a query to a search engine. The search engine can process the query and can provide information for output to the user in response to the query. In addition to search results, information provided for output to the user can include a summary of facts about an entity referenced by the query.

SUMMARY

A system can identify content consumed by a user, as well as entities, e.g., singers, actors, musicians, writers, directors, television networks, or other production companies, associated with the consumed content. In response to receiving a query that identifies a content item or entity, the system can determine to provide a search results page that includes a knowledge card relevant to the content item or entity, and search results relevant to the content item or entity. A knowledge card is a user interface element that provides information, e.g., known facts, related to a particular entity referenced by a search query. The system can determine information to include in the knowledge card by identifying items that have been consumed by the user and that are associated with the content item or entity identified by the search query.

For example, a user can provide a query that identifies "The Rolling Stones" to a search engine, and the system can identify one or more content items that have been consumed by the user and that are related to "The Rolling Stones," such as albums or songs by "The Rolling Stones" that the user has listened to previously. Based on identifying content items that have been consumed, e.g., heard or viewed, by the user and that are related to "The Rolling Stones," the system can determine information to include in a knowledge card, for example, information that identifies other albums and songs by "The Rolling Stones" that the user may not have consumed. The system can provide the knowledge card that includes the determined information in a search results page, where the search results page features the knowledge card along with one or more other search results.

The server-based computing environment can receive indications of content consumed by the user from various sources and store information identifying the content, entities related to the content, and information associated with the consumption of the content by the user. For example, the system can determine that the user has listened to the album "Sticky Fingers" by "The Rolling Stones" on a particular date based on receiving information indicating that the user purchased the album "Sticky Fingers" on the particular date. The system can subsequently receive a request that identifies the user and "The Rolling Stones," and can provide a response to the request that includes information about "The Rolling Stones" and can also indicate other information related to "The Rolling Stones" and the user's consumption of the "The Rolling Stones," such as information identifying upcoming concerts that feature "The Rolling Stones" or information indicating that the user listened to "Sticky Fingers" on the particular date.

Innovative aspects of the subject matter described in this specification may be embodied in methods that include the actions of receiving a request that includes a user identifier of a user that submitted a search query, and an entity identifier of an entity that is associated with one or more query terms of the search query, determining that the entity that is associated with the one or more query terms of the search query is identified, in a media consumption database that identifies one or more media items that have been indicated as consumed by the user, as a media item that has been indicated as consumed by the user, or that the entity that is associated with the one or more query terms of the search query is associated with a media item that has been indicated as consumed by the user in the media consumption database, and providing a response to the request, based on the determination that the entity that is associated with the one or more query terms of the search query is identified, in the media consumption database that identifies one or more media items that have been indicated as consumed by the user, as a media item that has been indicated as consumed by the user, or that the entity that is associated with the one or more query terms of the search query is associated with a media item that has been indicated as consumed by the user in the media consumption database.

Other embodiments of these aspects include corresponding systems, apparatus, and computer programs, configured to perform the actions of the methods, encoded on computer storage devices.

These and other embodiments may each optionally include one or more of the following features. In various examples, the response to the request includes at least data indicating that the entity that is associated with the one or more query terms of the search query is identified, in the media consumption database that identifies one or more media items that have been indicated as consumed by the user, as a media item that has been indicated as consumed by the user or that the entity that is associated with the one or more query terms of the search query is associated with a media item that has been indicated as consumed by the user in the media consumption database; the response to the request includes at least data indicating either that the entity that is associated with the one or more query terms of the search query is identified, in the media consumption database that identifies one or more media items that have been indicated as consumed by the user, as a media item that has been indicated as consumed by the user, or indicating that the entity that is associated with the one or more query terms of the search query is associated with a media item that has been indicated as consumed by the user in the media consumption database; determining that the entity that is associated with the one or more query terms of the search query is identified, in the media consumption database that identifies one or more media items that have been indicated as consumed by the user, as a media item that has been indicated as consumed by the user, or that the entity that is associated with the one or more query terms of the search query is associated with a media item that has been indicated as consumed by the user in the media consumption database further comprises identifying the media item that has been indicated as consumed by the user in the media consumption database, and wherein providing the response to the request further comprises providing a response to the request that includes at least data that identifies the media item that has been indicated as consumed by the user in the media consumption database; receiving a request that includes a user identifier of a user that submitted a search query and an entity identifier of an entity that is associated with one or more query terms of the search query further comprises receiving one or more query terms of the search query, determining, based on the one or more query terms, an entity associated with the one or more query terms, and identifying the entity identifier associated with the entity; the media consumption database that identifies one or more media items that have been indicated as consumed by the user identifies a time when the media item was consumed by the user, and wherein providing a response to the request comprises providing a response to the request that includes data indicating the time when the media item was consumed by the user; the media consumption database that identifies one or more media items that have been indicated as consumed by the user identifies a location where the media item was consumed by the user, and wherein providing a response to the request comprises providing a response to the request that includes data indicating the location when the media item was consumed by the user.

Other innovative aspects of the subject matter described in this specification may be embodied in methods that include the actions of receiving a request that includes a user identifier of a user that submitted a search query, and an entity identifier of an entity that is referenced by the search query, identifying a plurality of knowledge elements that are related to the entity, identifying, in a consumption database, one or more items that have been indicated as consumed by the user and that are associated with the entity that is referenced by the search query, assigning, by one or more computers, rank scores to the plurality of knowledge elements, based at least on identifying the one or more items that have been indicated as consumed by the user and that are associated with the entity that is referenced by the search query, selecting one or more of the knowledge elements from among the knowledge elements based at least on the rank scores assigned to the knowledge elements, and providing, in response to the request, information associated with the entity and the one or more selected knowledge elements.

Other embodiments of these aspects include corresponding systems, apparatus, and computer programs, configured to perform the actions of the methods, encoded on computer storage devices.

These and other embodiments may each optionally include one or more of the following features. In various examples, a knowledge element is at least one of a known fact related to the entity or an item of content related to the entity; assigning rank scores to the plurality of knowledge elements comprises determining, based at least on identifying the one or more items that have been indicated as consumed by the user and that are associated with the entity that is referenced by the search query, a level of familiarity of the user with the entity, and assigning rank scores to the knowledge elements based at least on the determined level of familiarity of the user with the entity; assigning rank scores to the knowledge elements comprises determining item types associated with the items that have been indicated as consumed by the user and that are associated with the entity that is referenced by the search query, determining element types associated with one or more of the knowledge elements, and assigning rank scores to the knowledge elements, based at least on the item types associated with the items that have been indicated as consumed by the user and that are associated with the entity that is referenced by the search query, and the element types associated with the knowledge elements; providing information associated with the entity and the one or more selected knowledge elements comprises providing data that causes information associated with the entity and the one or more selected knowledge elements to be presented in a knowledge card, the knowledge card being presented with a search results page associated with the search query; providing data that causes information associated with the entity and the one or more selected knowledge elements to be presented in the knowledge card comprises determining, based on identifying the one or more items that have been indicated as consumed by the user and that are associated with the entity that is referenced by the search query, a position of the knowledge card, wherein the determined position defines a position of the knowledge card being presented with the search results page associated with the search query, and providing, in response to the request, data that causes the knowledge card to be presented with the search results page such that the position of the knowledge card presented with the search results page corresponds to the determined position; providing data that causes information associated with the entity and the one or more selected knowledge elements to be presented in the knowledge card comprises determining, based on identifying the one or more items that have been indicated as consumed by the user and that are associated with the entity that is referenced by the search query, a number of knowledge elements to select for presentation in the knowledge card, and providing, in response to the request, data that causes the knowledge card to be presented with the search results page such that the knowledge card includes the determined number of knowledge elements selected for presentation in the knowledge card.

Other innovative aspects of the subject matter described in this specification may be embodied in methods that include the actions of receiving a request that includes a user identifier of a user that submitted a search query, and an entity identifier of an entity that is referenced by the search query, identifying, in a consumption database that identifies one or more items that have been indicated as consumed by the user, one or more items that have been indicated as consumed by the user and that are associated with the entity that is referenced by the search query, determining, by one or more computers and based at least on identifying the one or more items that have been indicated as consumed by the user and that are associated with the entity that is referenced by the search query, a position of a knowledge card, wherein the determined position defines a position of the knowledge card presented with a search results page associated with the search query, and providing, in response to the request, data that causes the knowledge card to be presented with the search results page such that the position of the knowledge card presented with the search results page corresponds to the determined position.

Other innovative aspects of the subject matter described in this specification may be embodied in methods that include the actions of receiving a request that includes a user identifier of a user that submitted a search query, and an entity identifier of an entity that is referenced by the search query, identifying, in a consumption database that identifies one or more items that have been indicated as consumed by the user, one or more items that have been indicated as consumed by the user and that are associated with the entity that is referenced by the search query, and determining, by one or more computers, whether to present a knowledge card with a search results page based at least on identifying the one or more items that have been indicated as consumed by the user and that are associated with the entity that is referenced by the search query.

Other embodiments of these aspects include corresponding systems, apparatus, and computer programs, configured to perform the actions of the methods, encoded on computer storage devices.

These and other embodiments may each optionally include one or more of the following features. In various examples, the features include based on determining to present a knowledge card with a search results page, providing, in response to the request, data that causes the knowledge card to be presented with a search results page; the features include based on determining not to present a knowledge card with a search results page, bypassing providing data that causes the knowledge card to be presented with a search results page.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 8A to FIG. 8D depict example user interfaces that provide knowledge cards based on a media consumption history.

Like reference symbols in the various drawings indicate like elements.

DETAILED DESCRIPTION

This specification describes a media consumption history that identifies content items that have been indicated as consumed by a user. The media consumption history can be accessed to determine information associated with the content items consumed by the user, as well as information associated with the user's consumption of the content items. In a particular application that uses the media consumption history, a user provides a search query that identifies a particular entity to a search engine, and in response to the query, information related to the entity is presented to the user in a knowledge card. For example, the user can provide the query, "The Rolling Stones" to a search engine. In response to the query, a search results page can be presented to the user, where the search results page includes a knowledge card. The content presented in the knowledge card can depend on the media consumption history of the user.

In the following discussion, FIGS. 1-4 describe methods for creating a media consumption history that identifies content that has been indicated as consumed by the user, and a method of accessing the media consumption history to respond to requests for information. FIGS. 5-7 and 8A to 8D then describe a particular implementation that utilizes the media consumption history to determine information to include in knowledge cards that are presented in response to search queries input by users.

Figure 1:
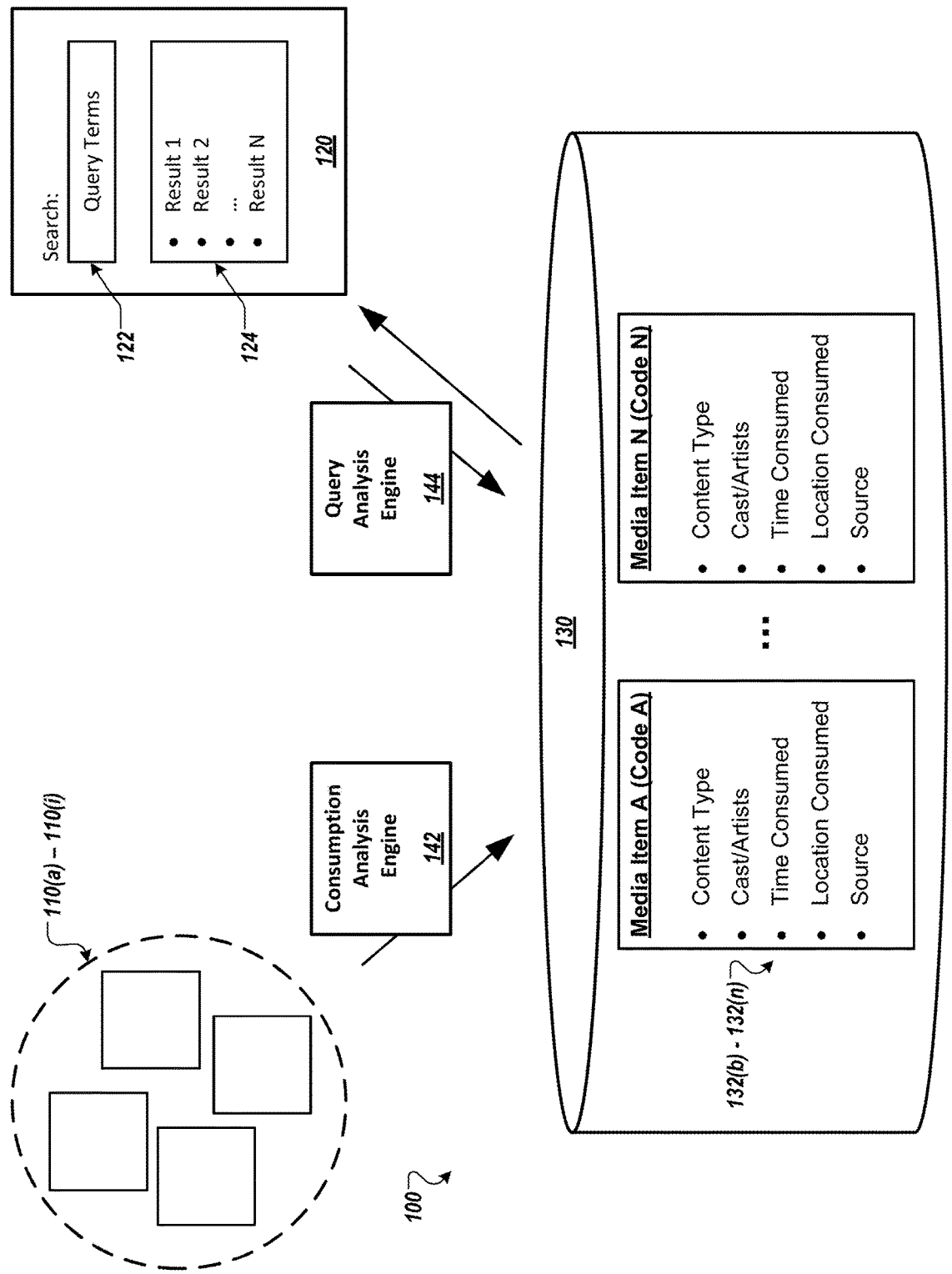
FIG. 1 depicts an example system for responding to requests based on a media consumption history.

FIG. 1 depicts a system 100 for responding to queries based on a media consumption history for a user. As used in this specification, a query can be any request for information provided to the system 100, such as a query input at a search engine or a personal assistant application.

Briefly, the system 100 can receive indications that identify content that a user has consumed and information associated with the user's consumption of the content. The system 100 can store information identifying the content, one or more entities associated with the content, and information associated with the user's consumption of the content.

A request for information can be received that identifies the user and a particular content item or entity associated with a content item, such as a search query in which one or more terms of the query identify a content item or entity. In response to the request, the user's consumption history can be accessed and one or more content items or entities can be identified that relate to the content item or entity specified by the request. The response to the request can then include information relating to or identifying the content consumed by the user and/or entities associated with the consumed content that are related to the content or entity specified by the request.

As used in this specification, content can be identified as consumed by the user based on the user likely having viewed the content, listened to the content, read the content, or otherwise been exposed to the content or a portion of the content. Therefore, categorizing content items as content consumed by the user generally includes accessing data associated with the user that identifies content that the user is reasonably likely to have consumed and categorizing the identified content as content that has been consumed by the user. Content can include content items such as one or more movies, television shows, songs, albums, concerts, plays, recorded interviews, videos, books, magazines, newspapers, websites, or other web-based, audio, video, text, or mixed media content. Additionally, one or more entities may be associated with a content item, for example, one or more actors, directors, writers, singers, musicians, artists, photographers, editors, bands, record labels, production companies, television networks, radio networks or stations, companies, products, songs, soundtracks, etc. In some instances, a content item may be referred to as an entity, e.g., a movie, television show, song, etc., or an entity associated with a content item may be a content item in its own right, e.g., a soundtrack may constitute a content item.

In some instances, places may be identified as a type of content, where the places can be associated with one or more entities. A particular place may be referred to by the geographical location of the place, e.g., latitude and longitude coordinates or an address, or the place may be identified by a name assigned to the place. For example, a place identified as the "National Archives" may be associated with a particular location, e.g., the street address 700 Pennsylvania Avenue NW, Washington, D.C., and may additionally be associated with entity identifiers for one or more entities, e.g., the "Declaration of Independence." A user may be identified as having been located at the particular place, and having consumed one or more entities associated with the place.

A consumption history can equivalently identify places that a user has been located. A location history can identify information and/or entities associated with places that the user is identified as having been located. Such information can include information pertaining to an identified location, e.g., an address and operating hours for the "National Archives," or can identify information pertaining to entities associated with an identified location, e.g., information pertaining to the "Declaration of Independence." Thus, the techniques described with respect to media consumption histories and to responding to queries based on information included in media consumption histories is similarly applicable to location histories, or histories integrating media consumption histories with locations. Briefly, the system 100 can include one or more content consumption sources 110(*a*)-110(*i*), a query engine 120, a content consumption engine 130, a consumption analysis engine 142, and a query analysis engine 144. The content consumption sources 110 (*a*)-110(*i*) are in communication with the content consumption engine 130 over one or more networks, such as a local area network (LAN), or wide area network (WAN), such as the Internet. The content consumption engine 130 can receive data from the content consumption sources 110(*a*)-110(*i*) indicating content consumed by a user as well as information associated with the user's consumption of the content, such as a time and place where the user consumed the content.

Data can be stored at a media consumption history database associated with the content consumption engine 130, where the data identifies the content consumed by the user and information associated with both the user's consumption of the content, e.g., when and where the user consumed the content, and the content itself, e.g., one or more entities associated with the content. For example, the consumption analysis engine 142 can identify a cast list associated with a movie that the user is identified as having viewed, and the content consumption engine 130 can store information identifying the movie, the user, a time and place where the user watched the movie, and information identifying the cast members of the movie.

The query engine 120 can be in communication with the content consumption engine 130 over one or more networks such that the content consumption engine 130 can receive and respond to requests for information from the query engine 120. Requests received from the query engine 120 can identify a user and can be analyzed by the query analysis engine 144 to identify a particular content item or entity associated with the request. Content corresponding to the particular content item or entity identified by the query analysis engine 144 can then be identified at the content consumption engine 130.

For example, based on determining that a query mentions the figure "Justin Timberlake," content items consumed that feature "Justin Timberlake" can be identified, e.g., content in which "Justin Timberlake" has acted, sang, directed, produced, etc. A response to the request provided to the query engine 120 can identify content featuring "Justin Timberlake" that the user has consumed, and can also identify additional information associated with the user's consumption of the content, e.g., when and where the user consumed the content. The response to the request can also include information pertaining to the content or entity identified from the query, as well as the information pertaining to the content that has been consumed by the user. For example, the response to the query can include a biography relating to the figure "Justin Timberlake," and a synopsis for a movie that the user has watched that features "Justin Timberlake." Information pertaining to content that has been consumed by the user or entities associated with the consumed content can be accessed at a system that is external to the system 100, for example, by accessing content that is available on the Internet over one or more networks.

Content that a user consumes can be identified by one or more sources 110(*a*)-110(*i*). According to some implementations of the described subject matter, the content consumption sources 110(*a*)-110(*i*) can include any source that is capable of receiving information that indicates particular content that has been consumed by a user, or can include sources that are capable of determining content that has been consumed by the user. In some implementations, the content consumption sources 110(*a*)-110(*i*) can use application program interfaces (API) to identify content that has been consumed by a user. In some examples, the content consumption sources 110(*a*)-110(*i*) can be any application, server, or other system capable of receiving or accessing information identifying content consumed by a user. In some implementations, the application, server, or system can identify content consumed by the user based on accessing other information associated with the user, such as financial information associated with the user or a social network profile associated with the user. In still other implementations, the content consumption sources 110(*a*)-110(*i*) can include sources of information, e.g., email, social networks, etc., that can be accessed to determine the content consumed by a user.

For example, content consumption sources 110(*a*)-110(*i*) can include sources that provide proofs of purchase of a content item. A proof of purchase may include a receipt, such as an electronic receipt received at an email address of a user, or a transaction documented by the user, e.g., using a personal finance application. A charge applied to a credit card, debit card, gift card, or other payment account associated with the user may also be used to determine that a user has consumed certain content. For example, a charge billed to a credit card can indicate that the user has likely purchased or rented a particular movie, or a purchase using a payment account, e.g., PayPal, can indicate that the user has likely purchased or rented the movie. Such payment information may indicate sufficient likelihood of the user having consumed the particular content, and the particular content associated with the payment can be categorized as having been consumed by the user. Similarly, a purchase history associated with the user can be used to determine that the user has consumed particular content. For example, purchases and/or rentals from an online store or cable network service, e.g., Google Play, Apple iTunes, Pay Per View, Comcast OnDemand, etc., can indicate that a user has consumed the particular content. In some instances, proofs of purchase associated with particular events, e.g., concert tickets purchased by a user, can indicate content that has been consumed by the user.

The content consumption sources 110(*a*)-110(*i*) may also include sources that identify a content consumption history of the user. For example, a web history associated with the user, e.g., a browser history associated with a computing device of the user, can indicate content consumed by the user. Such web content can include video or audio content consumed by the user, e.g., that the user has viewed at a website such as YouTube, Hulu, or another source, can include magazines, newspapers, or other content containing text, e.g., magazine and newspaper articles that a user has accessed using the browser, radio or other audio content consumed by the user, e.g., that the user has listened to via an Internet radio source such as Pandora Internet Radio, or can include any other content that a user can consume at a device that can access the Internet. In some instances, a user's consumption history can include content that a user has accessed using other applications or media sources, such as a cable television viewing history that indicates content the user has played or viewed through their cable television service, or content that has been downloaded and/or streamed by the user using a third party service, e.g., a Netflix or Spotify history for the user.

In some implementations, the content consumption sources 110(a)-110(i) can include sources associated with actions performed by a user or requests input by a user, e.g., at one or more client devices associated with a user. For example, a user can request that a particular song, movie, or other content be identified using a content recognition application, and based on a particular content item being identified by the application, the content item may be identified as content that has been consumed by the user. In some implementations, a request input by a user and relating to a particular content item can be interpreted as correlating to the user having consumed the content. For example, a query input at a search engine that requests times that a particular movie will be shown at a movie theatre can cause the system 100 to determine that the user watched the particular movie on the day that the user input the query and at a location corresponding to the movie theatre.

The content consumption sources 110(a)-110(i) can include sources that identify a user's interactions with one or more social networks, where such interactions may indicate or be used in determining content that has been consumed by a user. For example, a user may post a message to a social network, e.g., at a profile or message board associated with the social network, that identifies content that that the user has consumed or is consuming. In some instances, determining particular content and one or more users who are consuming the content can involve parsing text associated with a message, post, caption, or other textual content available on the social network. For example, a user may post a message to a social network that recites, "Going to see "The Social Network" with Bob at The Senator Theater at 9:00 tonight!" Based on parsing the text of the post, the system 100 may identify content, e.g., the movie called "The Social Network," one or more users, e.g., the user who posted the message and the user identified as "Bob," a location associated with the users consuming the content, e.g., a location corresponding to "The Senator Theater," and a time and date when the content is consumed, e.g., 9:00 PM on the particular day of the post.

In addition to parsing text associated with interactions performed at a social network, such as messages, posts, and captions, other social network interactions may be used to identify content that has been consumed by a user. In some implementations, content can be identified as consumed by the user based on the user providing an endorsement for the content at a social network, e.g., by providing a "+1" for the content, as used by Google+, or a "Like" for the content, as used by Facebook and other social networks. In some instances, images, videos, or other content posted by a user and identifying a particular content item can be treated as an indication of the user consuming the particular content, e.g., on the particular day and at the particular location from where the image, video, or other content was posted. In some instances, interactions posted to the social network such as comments, posts, messages, captions, images, videos, or other interactions that mention and/or tag multiple users may indicate that the particular content associated with the interaction was consumed by both the user posting the interaction as well as the one or more other users mentioned or tagged in association with the interaction. In some instances, "check-ins" or other indications of a user's location can be used to determine content consumed by a user, the "check-in" or other indication also identifying a time and a location associated with the user consuming the content.

Identifying a location associated with a user's consumption of a content item can include identifying a geographic location associated with the consumption of the content and/or a name of a location associated with the consumption of the content. For example, consumption of content by a user can be associated with a particular geographical location, such as a set of coordinates, e.g., latitude and longitude or other global positioning system (GPS) coordinates, can be associated with a particular distance from a present location or from a home location, can be associated with a particular city, state, zip code, area code, county, region, or country, or can be otherwise by identified by a geographical location. In some implementations, a geographical location associated with the consumption of particular content by a user is identified based on user-provided information that identifies a geographical location associated with their consumption of the content, e.g., based on the user providing information at a user account or social network that identifies their geographical location and, optionally, the content they have consumed at that geographical location. In some implementations, a location can be identified by the name of a business or a type of business, e.g., "The Senator Theater" or "movie theatre," can be identified by an event that is taking place at a particular location at a particular time, e.g., at a location corresponding to the "Maryland State Fair," can be identified by a street address, by a name assigned to a particular location by a user, e.g., a location identified as a user's place of employment or home, or can be identified in another way.

Identifying a time associated with a user's consumption of a content item can include identifying a particular date, day, or time, e.g., hour of the day, when the user consumed the identified content. In some implementations, a time associated with a user's consumption of particular content is based on a time that the content consumption sources 110(a)-110(i), the consumption analysis engine 142, or the content consumption engine 130 receive data indicating that the particular content has been consumed by the user. In other implementations, a time associated with a user consuming particular content may be determined based on information received, e.g., at the content consumption sources 110(a)-110(i), that indicates a time that the content was consumed by the user. For example, information indicating that a user rented the movie "The Social Network" at 8:00 PM on Thursday, Jul. 4, 2013 can be received at a content consumption source 110(a)-110(i), content analysis engine 142, or content consumption engine 130 at 12:00 PM on Friday, Jul. 5, 2013. Based on the information received, the time that it was received by the system 100, and the implementation utilized, the time associated with the user watching the movie "The Social Network" may be identified as 8:00 PM on Thursday, Jul. 4, 2013, 12:00 PM on Friday, Jul. 5, 2013, or some subset of these dates, days, and times, e.g., Jul. 4, 2013 or Friday, Jul. 5, 2013.

Additional information may be received by the one or more content consumption sources 110(a)-110(i) related to the consumption of content by users. For example, additional information may include information pertaining to the content item, such as a file type of the content item, e.g., MP4, WAV, JPEG, HTML, etc., a file size or playback length associated with the content item, e.g., 100 Megabytes or 10 minutes in length, a quality or compression resolution associated with the file type, e.g., 1080p or 256 kbps, or other information pertaining to the content item as it was consumed by the user, e.g., whether the content item was black and white content, color content, content that was shown in high definition or standard definition, etc. In some implementations, a device used to access the content can be identified. For example, a particular content item may be a music album, and the content consumption sources 110(a)-110(i) can determine that the user has listened to the music album using a particular mobile phone, smartphone, laptop or desktop computer, tablet computer, MP3 player, or other computing device.

Information received by the one or more content consumption sources 110(a)-110(i) may further indicate the exact source or event that resulted in particular content being identified as consumed by a user. For instance, information received at a source 110(a)-110(i) can indicate particular content consumed by a user and a location and/or time that the content was consumed by the user, and can further indicate an event or a source of the indication that resulted in the content be identified as consumed by the user. As an example, data received can identify a particular movie that a user has viewed, a time and location where the user viewed the movie, and can further indicate that the movie was identified as having been watched by the user based on an email received at an email address associated with the user indicating that the user has purchased a movie ticket to attend the movie.

In some implementations, identifying content that has been consumed by a user can further include identifying or estimating particular portions of the content that have been consumed by the user. In some implementations, identifying content using audio recognition can involve identifying timestamps of the content that correspond to portions of the content that were identified and/or the portions of the content to which the user was exposed. For example, in response to a user requesting audio recognition of content, a content consumption source 110(a)-110(i) associated with the request may receive data identifying a content item and further identifying a segment of the content item that was analyzed to identify the content, e.g., a 30 second segment of the content upon which audio recognition was performed to identify the content.

In some implementations, information identified by one or more content consumption sources 110(a)-110(i) can be supplemented by other information accessed by the system 100 to determine content consumed by a user. For instance, information received may identify content consumed by a user as well as a location and/or time when the user consumed the content, and the consumption analysis engine 142 can access additional information associated with the content, the location, or the time.

In some implementations, the consumption analysis engine 142 may be an application hosted on one or more computers, may be associated with a server, or may be another system capable of accessing information relevant to identified content and/or a location or time when a user consumed the identified content. In some examples, the consumption analysis engine 142 may be a separate component from both the content consumption sources 110(a)-110(i) and the content consumption engine 130, or can be integrated with the content consumption sources 110(a)-110(i) and/or content consumption engine 130. The consumption analysis engine 142 may be capable of exchanging electronic communications over one or more networks, for example, to exchange electronic communications with the content consumption sources 110(a)-110(i) and the content consumption engine 130, or to access information that is available external to the system 100, e.g., to access information that is available on the Internet. In some implementations, the consumption analysis engine 142 receives information identifying content that a user has consumed and/or a location or time associated with the user's consumption of the content. The consumption analysis engine 142 can analyze the information and/or access additional information associated with the content, the location, and/or the time.

In some instances, the consumption analysis engine 142 can receive an indication identifying content that has been consumed by a user, and one or more content items associated with the identified content can be identified and classified as having been consumed by the user. For example, based on determining that a user has watched a certain movie, a determination can also be made that the user consumed content corresponding to the soundtrack of the movie. In some implementations, the one or more related content items can be identified based on the information obtained by the one or more sources 110(a)-110(i), e.g., that identifies the soundtrack of the movie, or can be based on information obtained from another resource that is accessible by the consumption analysis engine 142, e.g., at a database that identifies the soundtracks of movies.

Identifying related content that has been consumed by a user can, in some implementations, be determined based on the source used to determine that the content was consumed by the user. As an example, if an audio recognition request is provided by a user and the audio recognition engine identifies the content as being a part of "The Phantom of the Opera" soundtrack, the consumption analysis engine 142 may determine that the user likely consumed both "The Phantom of the Opera" soundtrack as well as the Broadway production of "The Phantom of the Opera," e.g., that the user provided the audio recognition request while attending a performance of "The Phantom of the Opera." However, if a determination is made that the user has consumed "The Phantom of the Opera" soundtrack based on purchase history data, e.g., data received at a content consumption source 110(a)-110(i) indicating that the user purchased "The Phantom of the Opera" soundtrack at an online music store, then the consumption analysis engine 142 may determine that the user has not likely consumed both the soundtrack and the live performance of "The Phantom of the Opera."

The location and/or time associated with a user's consumption of content may also be considered when determining other content related to the content that the user is likely to have consumed. For instance, based on receiving information indicating that the user has performed an audio recognition to identify "The Phantom of the Opera" soundtrack while at a location corresponding to a theatre, the consumption analysis engine 142 may determine that the user has likely consumed both "The Phantom of the Opera" soundtrack as well as the live performance of "The Phantom of the Opera." However, based on receiving information indicating that the user has performed an audio recognition to identify "The Phantom of the Opera" soundtrack while at a location corresponding to the user's place of employment, a determination may be made that the user has likely only consumed "The Phantom of the Opera" soundtrack, and is not likely to have viewed the live performance of "The Phantom of the Opera."

In some instances, the consumption analysis engine 142 can receive information identifying a time and location where a user was located, and can identify content that the user likely consumed while at the particular location during the identified time. In some instances, the content can be identified by accessing information, e.g., over one or more networks, that indicates content that is likely to be available at the location during the specified time. For example, based on a social network "check-in" indicating that a user was located at "Radio City Music Hall" on a particular date, the consumption analysis engine 142 may access information to determine content that the user likely consumed while located at "Radio City Music Hall" on the particular date.

Additional information relating to content consumed by a user can be identified. In some implementations, the additional information can be identified by the consumption analysis engine 142. The additional information can be identified by accessing information that is available over one or more networks, such as by accessing information available on the Internet or at a database or server that is accessible over the one or more networks. In some instances, the additional information relating to the consumed content can be maintained and accessed at the system 100, for example, at the content consumption engine 130.

In some implementations, supplemental information accessed by the consumption analysis engine 142 that relates to particular content can include information relating to the particular content. For example, additional information relating to an identified content item can include a content type for the content item, e.g., a general content type for the content item that indicates whether the content is a video, audio, image, or text, or a specific content type for the content item that indicates whether the content is a television show, podcast, audio book, movie, concert, newspaper, magazine, etc. Information relating to an identified content item can also include information associated with the production of the content, such as a year that the content was produced, a location where it was produced, a producer of the content, etc.

Supplemental information accessed by the consumption analysis engine 142 can further identify one or more entities that are associated with the content. For example, information relating to an identified content item can include information identifying one or more people associated with the content item, e.g., a cast list for the content item, a director or producer of the content item, individuals' voices that appear in the content item, writers or editors associated with the content item, etc. In some implementations, identifying one or more people associated with a content item includes identifying the role of the one or more people with respect to the content item, e.g., a character played by an actor in a movie.

In some implementations, identifying one or more entities that are associated with the content can further include identifying one or more content items that are relevant to the content consumed by the user. For example, based on receiving information indicating that a user has viewed a particular movie, one or more other movies or other content items can be identified that are relevant to the particular movie, e.g., one or more movies or television programs that feature actors from the identified movie. According to another example, one or more content items that are relevant to the movie viewed by the user may be movies or other content items that are relevant to the identified movie in other ways, e.g., based on the other movies being nominated for an award that was the same as the identified movie, based on the movies being directed or produced by a common person, etc.

Based on identifying particular content consumed by a user, one or more other users that are relevant to the identified content may also be determined. For instance, based on receiving an indication that a user consumed particular content while at a certain location and/or at a certain time, one or more other users that are relevant to the consumption of the content by the user may be identified. In some examples, users that are relevant to the consumption of the content by the user may be one or more users that are indicated as being with the user at the time the content was consumed. For example, a post at a social network profile of the user may identify a content item, e.g., a movie, as well as one or more other users, e.g., other people that the user was with while viewing the movie.

Determining one or more other users associated with a particular content item may also be determined based on the locations of one or more other users at the time the user consumed the particular content. For instance, based on identifying content that the user consumed while located at "Radio City Music Hall," one or more other users can be identified as related to the particular content based on determining that the other users were also at "Radio City Music Hall" at a similar time. In other examples, one or more other users that are relevant to the identified content may be other users that have also consumed the identified content. For example, based on receiving an indication that a user has viewed the movie "The Social Network," one or more other users can be identified that have also been identified as having viewed the movie "The Social Network," e.g., based on information accessed at social network profiles of the one or more other users, based on accessing information at the system 100 indicating other users that have been identified as having viewed the movie, etc.

In some instances, additional analysis may be performed relating to content consumed by a user, a location that the user consumed the content, and/or a time when the content was consumed by the user. In some instances, the consumption analysis engine 142 can perform such analysis based on receiving information from one or more content consumption sources 110(a)-110(i) indicating content that has been consumed by a user at a particular time and/or location. In some instances, the analysis can also consider additional information received at the consumption analysis engine 142, e.g., one or more timestamps associated with the user recognizing or viewing the content, a device used by the user to consume the content, a source of the indication that the user has consumed the content, etc.

In some instances, timestamps or other information relating to a user's consumption of content can be identified and used to determine or estimate a portion of the content item consumed by the user. Additional information regarding the content item can be identified based on the portion of the content that is identified as having been consumed by the user. For instance, a movie that the user has watched may be identified based on cable television history data, e.g., data that identifies digital cable television content that the user has watched, and the cable television history data may be used to determine that the user watched a specific portion of the movie and not the entire movie. In another example, timestamps detected based on an audio recognition process can be used to determine a portion of a movie that a user has likely watched, e.g., at least a one hour portion of the movie that includes the segments of the movie corresponding to the identified timestamps. Based on determining the specific portion of the movie watched by the user, information can be accessed that is relevant to the specific portion of the movie, e.g., a partial cast list that is relevant only to the portion of the movie watched by the user, a portion of a soundtrack that is played during the portion of the movie, or other entities associated with the portion of the movie.

In some implementations, identifying a portion or extent to which a user has consumed particular content can allow the content to be categorized as content that has been fully consumed, partially consumed, or unconsumed by the user.

For instance, based on cable television history data indicating that a user has viewed all of a first movie but only a portion of a second movie, a determination can be made that the user has fully viewed the first movie but has only partially viewed the second movie. In some instances, a portion of a content item that has been consumed may be determined, e.g., a number of minutes of the movie or a fraction of the movie's total playing time, and a content item can be identified as fully consumed, partially consumed, or unconsumed based on the amount of time or fraction satisfying one or more thresholds. For example, if less than 25 percent of a content item is identified as having been consumed by the user, the content item may be categorized as unconsumed by the user, if 25 percent to 75 percent of the content item is identified as consumed by the user, the content item may be categorized as partially consumed, and if more than 75 percent of the content item has been consumed by the user, then the content item may be identified as fully consumed.

In some implementations, a confidence score can be determined and associated with particular content that indicates a likelihood that the identified content has been correctly identified. For example, the consumption analysis engine 142 can determine content consumed by a user and can consider one or more factors associated with the consumption of the content to determine a confidence score to assign to the content and/or one or more entities associated with the content. For instance, a content item that has been identified based on cable television history data may be assigned a confidence score that indicates a higher likelihood of the content being correctly identified that a content item that has been identified using audio recognition. In some implementations, a higher likelihood may be indicated by a higher confidence score, e.g., a greater magnitude, may be indicated by a lower confidence score, e.g., a lower magnitude, or may be indicated using another scoring method. In practice, any number of factors may be used to determine a confidence score or other confidence scores to assign to particular content that has been consumed by a user, such as the source by which the content was recognized, the location or time associated with the content being consumed, etc.

For example, a separate confidence score can be determined that indicates a likelihood that identified content was fully consumed by a user. A content item can be categorized as having been fully consumed based on the determination that the user has likely viewed, listened to, read, or otherwise been exposed to a sufficient portion of the content item, e.g., 75 percent, and the confidence score can indicate an estimated likelihood that the user has actually fully consumed the content item. For instance, content that has been identified as consumed based on a receipt, e.g., a movie theatre receipt indicating that the user viewed a particular movie in theatres, may be assigned a confidence score that indicates a higher likelihood of the content item being fully consumed by the user than content that has been identified as consumed by the user based on an audio recognition process. In practice, any number of factors may be used to determine such a confidence score to assign to the particular content. For example, the portion of a movie's audio that is used to identify the movie may be indicative of whether the user has fully watched the movie, e.g., such that a movie recognized using audio from an opening scene of the movie receives a higher confidence score than a movie recognized based on audio from a closing scene of the movie. In other examples, a location or time associated with the user consuming the content can be indicative of whether the user fully consumed the content, e.g., such that if the user viewed a movie from 1:00 AM to 4:00 AM at their home, it is likely that the user has fallen asleep during the movie and not fully watched the movie.

In some implementations, one or more factors and/or confidence scores may be aggregated to determine an overall score associated with particular content that has been consumed by a user. For example, factors including a confidence by which the content was identified, a confidence that the content was fully consumed by a user, a source used to determine that the content was consumed by the user, a location, time, or device associated with the user consuming the content, etc., can be used to determine an overall score associated with the particular content. In some instances, such a score can also be identified for one or more entities associated with content, e.g., a particular actor that appears in a movie. Based on factors such as the amount of time that the actor appears in the movie, when the actor first appears in the movie, a popularity or success of the movie, etc., a score can be assigned to the entity corresponding to the actor.

In some implementations, feedback provided by a user may be used to identify or confirm content consumed by the user. For instance, based on determining that a user may have consumed particular content, a notification can be provided to a user, e.g., output at a client device associated with the user, that requests the user to confirm whether they have consumed the particular content and/or to confirm a location and time associated with the user consuming the content. For example, an audio recognition result may indicate that a user has recently viewed the movie "The Social Network," and a notification can be provided to the user that requests confirmation from the user that he or she has recently viewed the movie "The Social Network." Based on the user indicating that he or she has recently viewed the movie "The Social Network," the movie "The Social Network" can be identified as content that the user has consumed, and a location and time associated with the user consuming the content can be identified. In some instances, feedback provided by a user regarding particular content can result in changes to confidence scores associated with the content or one or more entities associated with the content, e.g., by increasing a confidence score associated with particular content based on the user confirming that they have consumed the particular content.

According to some implementations of the described subject matter, content and/or entities associated with content may be identified using a content or entity code. For example, the consumption analysis engine 142 or another component of the system 100 can identify a code, such as an alphanumeric code, quick response (QR) code, barcode, or other code that uniquely identifies a particular content item or entity. In some implementations, codes may be organized such that certain codes, code prefixes, or code types are associated with certain content types. For example. all movie content codes may begin with a certain letter or number, while all song content codes may begin with a different letter or number. A code that uniquely identifies a particular content item or entity can be associated with the content item or entity, e.g., by associating the code with the data identifying the content item or entity and the other relevant information, e.g., the location and time when the content was consumed.

Codes may be generated and assigned to content and/or entities associated with content by the system 100, e.g., by the content consumption sources 110(*a*)-110(*i*), the consumption analysis engine 142, or the content consumption engine 130. For example, based on receiving information indicating that a user has consumed content for which a code does not yet exist, e.g., a movie that has not yet been identified as viewed by the user and therefore has not been assigned a code, a code can be generated, e.g., by the content consumption source 110(a)-110(i) that reported the user watching the movie, the consumption analysis engine 142, or the content consumption engine 130, that uniquely identifies the movie, and the generated code can be assigned to the particular movie. Similarly, based on determining that one or more entities associated with the movie have not been assigned a code, e.g., one or more actors in the movie have not been assigned a code identifying the actor, codes can be generated and associated with the one or more entities that uniquely identify the entities.

In other implementations, codes associated with content items and/or entities associated with content items may be accessible to the system 100, e.g., over one or more networks. For example, the consumption analysis engine 142 may receive an indication that particular content has been consumed by a user, and the consumption analysis engine 142 can identify a code to assign to the content, e.g., by accessing a database over the one or more networks that includes codes associated with particular content items and entities associated with content items. In some implementations, codes associated with content items and/or entities associated with content items may be accessed by the system 100 prior to receiving an indication that the user has consumed particular content. For example, codes associated with content items and/or entities can be accessed and stored at the content consumption engine 130, and based on identifying content that the user has consumed, the consumption analysis engine 142 or another component can identify one or more codes associated with the content and/or entities and can assign the proper codes to the content and/or entities.

Based on determining content consumed by a user, relevance scores can be determined and associated with the content item and/or one or more entities associated with the content item. A relevance score may indicate an extent to which a user is perceived to like or be interested in a particular content item and/or entity, or may indicate the relevance of a particular content item to a particular entity associated with the content item and/or the relevance of a particular entity to a particular content item.

For example, a relevance score may indicate a likely level of interest that a user has in an identified content item or entity. In some implementations, such a relevance score may be determined based on information that identifies the content item consumed by the user and one or more entities associated with the content item. For instance, content identified as having been consumed by a user based on the user providing an endorsement of the content at a social network may be assigned a higher relevance score in comparison to other content identified as having been consumed by the user based on the user's cable television history. Other information may be used in determining a relevance score associated with a content item. For example, a relevance score may be increased based on receiving data indicating that a user has consumed particular content more than one time, e.g., has re-watched a movie, that indicates a location where the user has consumed the content, e.g., at a movie theatre as opposed to their home, etc. Based on the received data, a relevance score may be generated and assigned to the content item and/or the one or more entities associated with the content item.

A relevance score assigned to an entity and associated with a particular content item may reflect an extent to which the entity is featured or relevant to the particular content item. Similarly, a relevance score assigned to a content item and related to a particular entity may reflect an extent to which to which the particular content item is relevant to the particular entity. For example, the consumption analysis engine 142 can assign a relevance score to an actor associated with a movie in which the actor has the leading role such that the relevance score reflects a rather high level of relevance, based on the actor being a principal figure in the movie. Similarly, a relevance score assigned to a movie and associated with a particular actor may be assigned a rather high level of importance based on the movie being a movie that the actor is known for, e.g., that the actor has won an award for or that was a popular role for the actor.

In some implementations, content items and/or entities associated with content items may be assigned ranks based on confidence scores and/or relevance scores assigned to the content items and/or entities. For instance, two or more consumed content items that feature a particular entity, e.g., two or more movies that feature a particular actor, can be assigned a rank, where the rank is based on one or more confidence scores and/or relevance scores assigned to the content items. In such an example, a content item that is ranked first may be a content item in which the entity has considerable relevance, e.g., a main character in a movie, while a content item with a lower rank may be a content item in which the entity has less relevance, e.g., a movie in which the actor only has a supporting role.

According to some implementations, assigning confidence scores, relevance scores, and/or ranks to one or more content items and/or entities associated with content items can be performed by the consumption analysis engine 142. For example, the consumption analysis engine 142 may access information relevant to two or more content items, e.g., on the Internet, and assign confidence scores and relevance scores to the two or more content items. For example, information accessed may indicate the role of an actor in each of two movies, and relevance scores may be assigned to the two movies based on the extent to which the movies feature the actor. The relevance scores can be maintained, e.g., at the content consumption engine 130, and the consumption analysis engine 142 may rank the two movies and/or other movies based on accessing the scores maintained at the content consumption engine 130.

Information identifying content consumed by a user, a location and time when the user consumed the content, and other identified information can be stored at a media consumption history database associated with the content consumption engine 130. For example, the consumption analysis engine 142 and/or the content consumption sources 110(a)-110(i) can transmit information related to content consumed by a user to the content consumption engine 130 over one or more networks, and the content consumption engine 130 can receive and store the information. In some instances, the information can be stored at a media consumption history database associated with the content consumption engine 130.

Storing information related to content consumed by a user at the content consumption engine 130 can include storing entries 132(b)-132(n) corresponding to the media items consumed by the user. The entries 132(b)-132(n) can identify content items that have been categorized as consumed by the user, e.g., that have been identified in information received at the one or more content consumption sources 110(a)-110(i) as having been consumed by the user. Each of the entries 132(b)-132(n) can identify a particular content item, e.g., using the name of the content item and/or a code associated with the content item, as well as additional information corresponding to the consumed content.

As shown in FIG. 1, information associated with the entries 132(b)-132(n) can include information identifying the content type, e.g., movie, television show, album, soundtrack, magazine, etc., the cast or artists associated with the content, e.g., one or more actors, singers, writers, or other entities associated with the content, a time when the content was consumed by the user, e.g., 8:00 PM on Jul. 4, 2013, a location associated with the user's consumption of the content, e.g., "Radio City Music Hall," a source of identification of the consumed content, e.g., a post at a social network, an email containing a ticket receipt, a Netflix purchase history, etc., and other information associated with the user's consumption of the content and/or the content itself. For instance, additional information may include one or more scores or ranks associated with the content, information associated with the production of the content, information identifying content that is similar or related to the content, one or more other users that are associated with the content or the user's consumption of the content, etc.

In some implementations, additional entries 132(b)-132(n) that correspond to entities associated with content may be maintained at the content consumption engine 130. For example, based on receiving information identifying content that has been consumed by a user, the content consumption engine 130 can identify one or more entities associated with the content that has been consumed by the user, and can include entries corresponding to the entities associated with the consumed content in the entries 132(b)-132(n). For example, the content consumption engine 130 can receive information identifying the movie "The Social Network" as content that has been consumed by the user, and can identify one or more entities associated with the movie, e.g., the actors "Justin Timberlake," "Jesse Eisenberg," and the director "David Fincher." Entries corresponding to the actors "Justin Timberlake" and "Jesse Eisenberg," as well as the director "David Fincher," can be included in the entries 132(b)-132(n) maintained at the media consumption history database of the content consumption engine 130, where the entries 132(b)-132(n) corresponding to "Justin Timberlake," "Jesse Eisenberg," and "David Fincher" can identify information and/or one or more entities associated with the entries 132(b)-132(n), e.g., one or more content items associated with each of "Justin Timberlake," "Jesse Eisenberg," and "David Fincher," and other information.

The data stored at the content consumption engine 130 and corresponding to one or more content items consumed by a user and/or entities associated with content items consumed by a user can be stored in any number of formats. For instance, data may be stored in a tabular format or other data matrix, or in a hierarchical data structure. In some implementations, each entry 132(b)-132(n) may correspond to a particular row or column of the data matrix, and information associated with each of the content items and/or entities associated with content may be included as entries in the row or column of the data matrix. Similarly, in other implementations, each entry 132(b)-132(n) may correspond to a particular high-level item in the hierarchical data structure, and information associated with each of the content items and/or entities associated with the content may be included as lower-level items depending from the high-level items in the hierarchical data structure.

In some implementations, a subset of the information associated with the entries 132(b)-132(n) can be stored at locations other than the content consumption database 130. For example, information identifying a particular content item that has been consumed by a user and information associated with the user's consumption of the content item, e.g., a time and location associated with the user consuming the content, can be maintained at the content consumption engine 130, and additional information associated with the content item, e.g., information identifying the cast of the content item, can be stored elsewhere, e.g., at a server external to the content consumption engine 130. In such instances, accessing information associated with a content item that has been consumed by the user can involve accessing information associated with an entry 132(b)-132(n) at the content consumption database 130 that corresponds to the content item as well as accessing information associated with the content item at an additional resource that is external to the content consumption engine 130, e.g., at another server accessible to the query engine 120 and/or query analysis engine 144. In some instances, accessing the information associated with the content, e.g., information identifying the cast of the content item, can be achieved by accessing a source of the content and/or the content item itself. For example, the additional information associated with the content item can be accessed at a location where the content item is stored or by accessing metadata associated with the content item.

Entries 132(b)-132(n) may be identified and accessed to obtain information relating to one or more content items consumed by a user and/or entities associated with content items consumed by the user. In some implementations, content and/or entities associated with content may be identified at the content consumption engine 130 using a code that uniquely identifies particular content items and/or entities. In other instances, content and/or entities associated with content can be identified based on a search performed at the content consumption engine 130, e.g., a search that specifies a name of the content or entity.

In some implementations, content, entities associated with content, and/or information relating to the content and/or entities can be identified at the media consumption history database of the content consumption engine 130 by performing expansion of the entries 132(b)-132(n). For example, an entry associated with a particular movie can be identified, and the entry can be expanded to reveal additional information associated with the entry. For instance, the expansion of a particular entry associated with a particular content item can enable the identification of a content type associated with the content item, one or more actors, artists, writers, or other entities associated with the content, a time associated with the user's consumption of the content, a location associated with the user's consumption of the content, a source of the indication that the user consumed the content, etc.

Based on the content consumption engine 130 maintaining entries 132(b)-132(n) identifying content and/or entities associated with content that has been consumed by a user, requests for information input by the user can be processed such that responses to the requests provide information that is relevant to content that has been consumed by the user. For example, a user can access a query engine 120, e.g., an interface that is associated with a search engine, and can provide one or more query terms at a query input field 122. Content and/or entities associated with content can be identified from the terms of the user-input query, and content consumed by the user or entities associated with content consumed by the user can be identified. A response to the user-input query can identify the content consumed by the user and/or entities associated with content consumed by the user that correspond to the content and/or entities identified from the terms of the user-input query. Such results may also include additional information relevant to the content consumed by the user and/or entities associated with the content consumed by the user, such as a time and location where the user consumed the identified content or content associated the entities.

The query engine 120 can include an interface capable of receiving a user input that requests information. In some implementations, query engine 120 may be an application interface that accepts textual input or voice input provided by a user. For example, the query engine 120 may be a personal assistant application associated with a computing device of a user, such as a user's cellular phone, smartphone, tablet computer, laptop computer, desktop computer, mp3 player, or other device. In other applications, the query engine 120 may be a system that is accessible on the Internet, e.g., at a web page associated with a search engine, or that is accessible using other means, e.g., by accessing a database or server system over one or more networks, such as one or more local area networks (LAN) or wide area networks (WAN).

The query engine 120 can identify a user that has provided a query or other request for information. For instance, the query engine 120 can determine a user identifier associated with a user based on the user being logged in to a user account, or based on another method. In some implementations, a query received at the query engine 120 can be a voice input query, and the query engine 120 can perform voice recognition to determine terms of the voice input query. In other implementations, the query engine 120 can transmit voice data corresponding to the voice input query to the query analysis engine 144 or to another system, and the query analysis engine 144 or other system can perform voice recognition to determine the terms of the voice input query. In some implementations, determining terms of a voice input query can involve obtaining a transcription of the voice input query and determining terms of the voice input from the text of the transcription of the voice input query.

The query engine 120 can receive inputs from a user, for example, at the query input field 122, and can display results of the query at a results field 124. In some instances, the query engine 120 obtains results by submitting a received query and information identifying the user to the query analysis engine 144 and/or content consumption engine 130 over one or more networks, and receiving results from the query analysis engine 144 and/or content consumption engine 130 over the one or more networks.

In greater detail, the query analysis engine 144 receives data identifying a user and terms associated with a user input query, and performs analysis of the terms to identify content and/or entities associated with the query. For example, the query analysis engine 144 can parse the text of the query, e.g., the one or more terms of the query, and can identify objects from the text of the query. Objects can include nouns or phrases from the text of the query, e.g., one or more proper nouns, phrases, nouns, or other parts of speech that may correlated to content, e.g., a name of a movie, or entities associated with content, e.g., a name of an actor.

Based on identifying objects from the query, the query analysis engine 144 can identify content items and/or entities associated with content items that correspond to the objects. In some instances, the query analysis engine 144 can identify content items and/or entities based on accessing a database that stores the names of content items and/or entities associated with content items, e.g., by accessing the database over one or more networks. In some instances, the database may be associated with the content consumption engine 130, or can be a database associated with another system, e.g., that is external to the system 100 and that is accessible over the one or more networks. In some instances, identifying content items and/or entities associated with content items that correspond to the objects can include identifying a code or other identifier associated with the content items and/or entities associated with the content items. For example, the query analysis engine 144 can identify the figure "Justin Timberlake" from the objects included in the query, and can further identify an alphanumeric code that uniquely identifies the figure "Justin Timberlake."

In some implementations, the query analysis engine 144 may be an application hosted on one or more computers, may be associated with a server, or may be another system capable of identifying content and/or entities based on terms included in a query. In some implementations, the query analysis engine 144 is a separate component from both the query engine 120 and the content consumption engine 130, or can be integrated with the query engine 120 and/or the content consumption engine 130. The query analysis engine 144 may be capable of exchanging electronic communications over one or more networks, for example, to exchange electronic communications with the query engine 120 and/or the content consumption engine 130, or to access information that is available on the Internet.

The query analysis engine 144 communicates with the content consumption engine 130 to identify content that the identified user has consumed or entities associated with the user-consumed content corresponding to the content and/or entities identified from the query. For example, the query analysis engine 144 can identify one or more content items and/or entities associated with content items from the terms of the query, and can transmit information identifying the one or more content items and/or entities associated with content items to the content consumption engine 130. In some implementations, the query analysis engine 144 can additionally transmit information identifying the user to the content consumption engine 130.

The content consumption engine 130 can receive data identifying the user and the content and/or entities identified from the query, and can identify content that has been consumed by the user that corresponds to the content and/or entities identified from the query. For example, the content consumption engine 130 can receive data identifying the user that input the query from the query engine 120 or the query analysis engine 144, and can receive data identifying one or more content items and/or entities associated with content items that have been identified from the query from the query analysis engine 144. The content consumption engine 130 can receive the data identifying the user and the one or more content items and/or entities over one or more networks.

In some implementations, the content consumption engine 130 can identify content that the identified user has consumed. For example, based on receiving data identifying the user that provided the query, the content consumption engine can identify entries 132(*b*)-132(*n*) at the media consumption history database associated with the content consumption engine 130 that identifies content that has been consumed by the user. In some instances, users can be identified by data that indicates a user identifier associated with the user. For example, the content consumption engine 530 can receive data that indicates a user identifier based on the user being logged in to a user account associated with the user, or based on another method. The content consumption engine 130 can receive the information identifying the user and can identify entries 132(b)-132(n) that are associated with the user based on the entries 132(b)-132(n) specifying the user identifier corresponding to the user, e.g., user account associated with the user.

Based on identifying entries 132(b)-132(n) that are associated with the user, entries that correspond to the content and/or entities identified from the query can be determined. For instance, based on the query identifying the figure "Justin Timberlake," one or more entries associated with the user can be identified that correspond to the figure "Justin Timberlake." Entries that may correspond to the figure "Justin Timberlake" may include, for example, the entry corresponding to the movie "The Social Network," in which "Justin Timberlake" was an actor.

In some implementations, identifying entries that correspond to the content and/or entities identified from the query can involve expanding the entries 132(b)-132(n) stored at the media consumption history database of the content consumption engine 130 to identify entries that identify the particular content and/or entities identified from the query. In some implementations, identifying entries that correspond to the content and/or entities identified from the query can involve performing a search at the media consumption history database associated with the content consumption engine 130 for the particular content and/or entities. For instance, identifiers for the content and/or entities identified from the query, e.g., the names or codes used as identifiers of the content and/or entities can be submitted as a query on the media consumption history database, and one or more content items and/or entities corresponding to those identified from the query can be determined. Other techniques may be used to identify entries from among the entries 132(b)-132(n) corresponding to the user that are related to the content and/or entities identified from the query.

Based on identifying one or more content items consumed by the user and/or entities associated with content items consumed by the user that correspond to the content and/or entities identified from the query, data identifying the one or more user-consumed content items and/or entities associated with user-consumed content items can be transmitted by the content consumption engine 130. For instance, the content consumption engine 130 can transmit information identifying the one or more user-consumed content items and/or entities associated with user-consumed content items to the query analysis engine 144 over one or more networks. In some instances, transmitting data that identifies the user-consumed content items and/or entities associated with user-consumed content items can involve transmitting data that includes additional information relating to the user-consumed content items and/or the entities associated with the user-consumed content items. The additional information may include information such as a location and time when content was consumed by the user, other content items and/or entities relevant to the user-consumed content and/or entities associated with user-consumed content, one or more scores associated with the user-consumed content and/or entities associated with the user-consumed content, one or more users associated with the user-consumed content and/or entities associated with the user-consumed content, or other information that has been determined and stored in association with the entries at the media consumption history database, e.g., other information determined by the content consumption sources 110(a)-110(i), the consumption analysis engine 142, and/or the content consumption engine 130.

The query analysis engine 144 can receive the information relating to the user-consumed content and/or entities associated with user-consumed content that correspond to the query, and can perform analysis of the information relating to the user-consumed content and/or entities associated with the user-consumed content. In some implementations, the analysis performed by the query analysis engine 144 can include determining the relevance of the identified user-consumed content and/or entities associated with user-consumed content to the content and/or entities identified from the query. For example, the query analysis engine 144 can determine the relevance of the movie "The Social Network" to the figure "Justin Timberlake."

In some implementations, identifying the relevance of identified user-consumed content and/or entities associated with user-consumed content can include determining or generating a relevance score for the user-consumed content and/or entities associated with user-consumed content. For example, a relevance score can be determined for the movie "The Social Network" that the user has watched in relation to the figure "Justin Timberlake." In some implementations, as described, the relevance score can be determined based on the extent to which entities are featured or relate to particular content items, e.g., based on whether an actor has a large role in a movie or a small role in a movie, and/or based on the extent to which two content items are related, e.g., based on the extent to which two movies are associated with one another by being sequels to one another, by featuring the same actors or directors, etc. In some implementations, the query analysis engine 144 can generate a relevance score, e.g., based on the factors described, or can identify a relevance score that has already been assigned to the content consumed by the user and/or entities associated with content consumed by the user, e.g., that has been assigned by the consumption analysis engine 142. In other implementations, the query analysis engine 144 can identify relevance scores associated with user-consumed content and/or entities associated with user-consumed content that have been determined by the consumption analysis engine 142.

In some instances, the query analysis engine 144 can determine a relevance score for the user-consumed content and/or entities associated with user-consumed content based on other objects or terms of a query. For example, one or more terms or objects that do not correspond to content and/or entities associated with content can be identified from a query. Based on receiving information identifying content consumed by the user and/or entities associated with content consumed by the user, a relevance score can be determined for each of the content items consumed by the user and/or entities associated with content items consumed by the user that reflect the relevance of the content items and/or entities to the other objects or terms. For example, based on determining that the query received from the user identifies the figure "Justin Timberlake" and also identifies the object "Mark Zuckerberg," which does not correspond to a particular content item or entity associated with a content item, the query analysis engine 144 may determine that the movie viewed by the user called "The Social Network" is highly relevant, based on the movie "The Social Network" featuring a character named "Mark Zuckerberg." In some implementations, the query analysis engine 144 can identify synonyms or related terms for the objects or terms of the query, and a relevance score can reflect the relevance of a content item and/or entity to the synonyms or related terms.

In some implementations, based on the identified and/or determined relevance scores, ranks can be determined for the content items and/or entities associated with content items that indicate the relevance of the user-consumed content and/or entities associated with the user-consumed content to the query. For example, based on determining relevance scores for each of the user-consumed content items and/or entities associated with the user-consumed content items, ranks can be assigned to the user-consumed content items and the user-consumed entities such that content items and/or entities having a relevance score indicating greater relevance will have a higher rank, while content items and/or entities having a relevance score indicating less relevance will have a lower rank. In some instances, the query analysis engine 144 can receive information indicating ranks for the content items consumed by the user and/or entities associated with content items consumed by the user, and the query analysis engine can use the indicated ranks as the ranks indicating the relevance of the user-consumed content items and the entities associated with the user consumed content items to the query.

The query analysis engine 144 can transmit data identifying and indicating the relevance of the user-consumed content and/or entities associated with the user-consumed content that are associated with the content and/or entities identified from the query to the query engine 120. For example, the query analysis engine 144 can transmit the data received at the query analysis engine 144 from the content consumption engine 130 that identifies the user-consumed content and/or entities associated with the user-consumed content to the query engine 120, and can also transmit data indicating the relevance of the identified user-consumed content and/or entities associated with the user-consumed content to the query engine 120. In some implementations, the data can be transmitted by the query analysis engine 144 to the query engine 120 over one or more networks.

The query engine 120 can receive the data from the query analysis engine 144 and can provide information for output to the user that provided the query. For example, the query engine 120 can receive information identifying the content that has been consumed by the user and/or entities associated with the content that has been consumed by the user that is associated with the query input by the user, as well as data identifying the relevance of the identified content and/or entities associated with the content. The query engine 120 can determine, based on the received information, information and/or resources to provide for output at the results field 124. For example, based on receiving the query that identifies the figure "Justin Timberlake," the query engine 120 can determine to output results that indicate personal information relating to "Justin Timberlake," e.g., his age, height, occupation, etc., as well as information relevant to the user regarding the figure "Justin Timberlake," e.g., information indicating that the user has seen "Justin Timberlake" in the movie "The Social Network," which the user watched at 8:00 PM on Jul. 4, 2013 at a particular location. In some instances, the information provided for output by the query engine 120 can include information not contained in the information received from the query analysis engine 144, e.g., can include information that was accessed over the Internet or at another system external to the system 100. In some instances, the information provided for output at the results field 124 by the query engine 120 can include information received from the query engine 144, such as portions of content relevant to the query that a user has consumed, or other information. In some instances, the query engine 120 can provide information for output at the results field 124 such that information accessed external to the system 100 is delineated from the information provided for output that was received from the query analysis engine 144, e.g., such that the two sets of information are displayed in different information panels.

Figure 2:
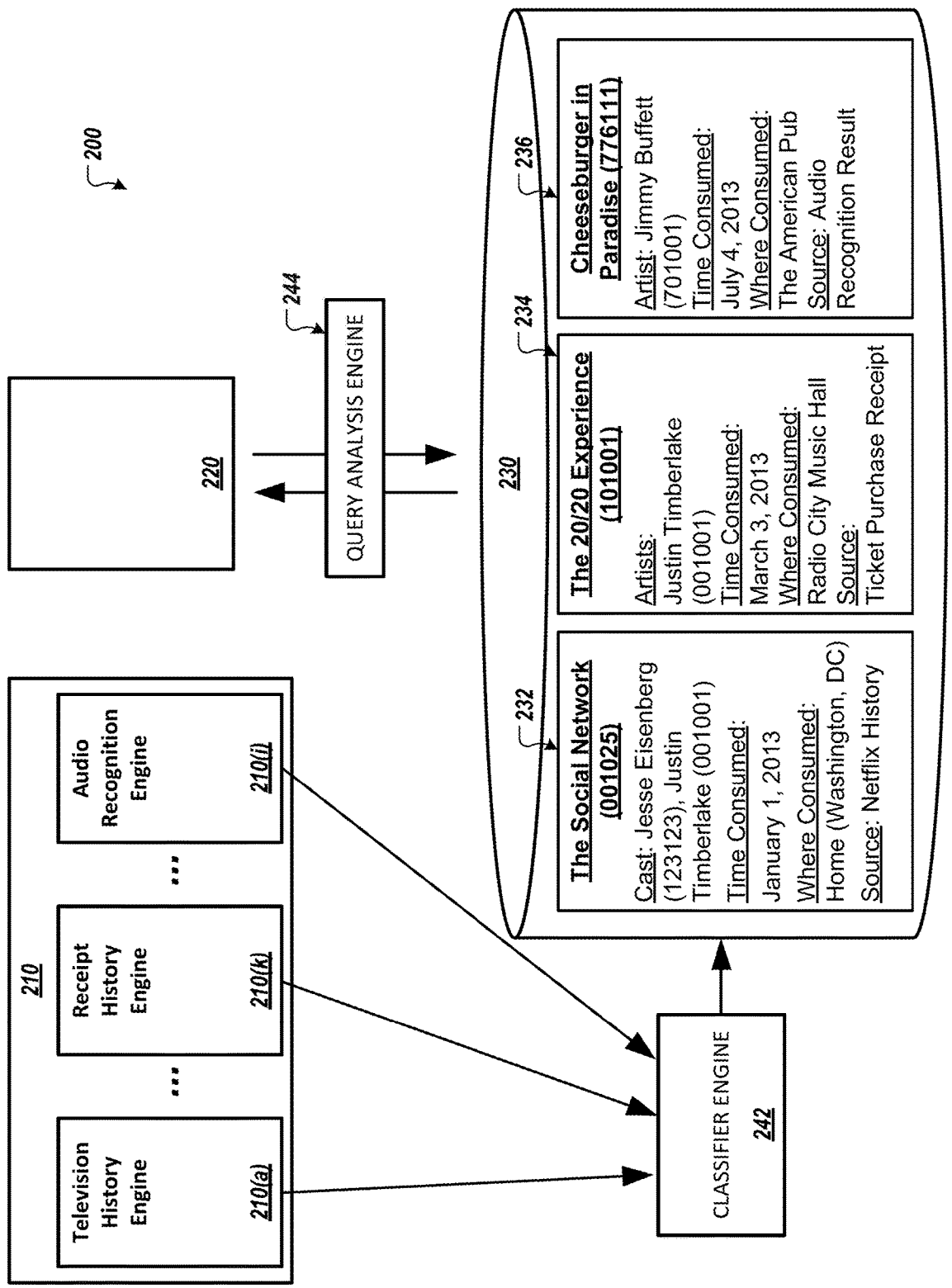
FIG. 2 and FIG. 3 depict portions of example systems for responding to requests based on a media consumption history.

FIG. 2 depicts a portion of an example system 200 for creating a media consumption history and utilizing the media consumption history to respond to requests. For example, the system 200 can be capable of receiving data identifying content consumed by a user, determining content associated with the user's consumption of the content, and storing information identifying the content consumed by the user and information associated with the user's consumption of the content. The system 200 includes one or more content consumption sources 210(a)-210(i) that are included in a content consumption source engine 210, a classifier engine 242, a query engine 220, a query analysis engine 244, and a content consumption engine 230. In some instances, the components of the system 200 can perform operations similar to those performed by the system 100.

The content consumption sources 210(a)-210(i) can receive information that identifies content that a user has consumed. For example, the television history engine 210(a), receipt history engine 210(k), and audio recognition engine 210(i) can each receive information that identifies content consumed by a user. For instance, content consumed by a user can include a movie that a user has viewed on television, and the television history engine 210(a) can receive information identifying the movie viewed by the user, as well as additional information associated with the user viewing the movie. In another example, the receipt history engine 210(k) can receive information identifying content that has been identified as consumed by a user, based on the receipt history engine 210(k) identifying a receipt that the user has received and a content item associated with the receipt. For example, the receipt history engine 210(k) can identify a receipt that indicates that the user has attended a concert, and the receipt history engine 210(k) can identify content associated with the concert, e.g., a recent album released by the artist who performed at the concert. In another example, the audio recognition engine 210(i) can receive a request input by a user to identify content corresponding to audio data obtained from the environment of the user, and the audio recognition engine 210(i) can identify the audio as corresponding to particular content. The audio recognition engine 210(i) can then identify the recognized content as content that has been consumed by the user. In another implementation, the audio recognition engine 210(i) can receive information identifying content that has been identified by an audio recognizer, e.g., an audio recognizer that is external to the system 200, and can determine that the user has consumed the identified content.

In some implementations, as described, information may be received by the content consumption sources 210(a)-210(i) of the content consumption source engine 210 in addition to the data identifying content consumed by the user. For instance, additional information may identify locations and times when the user consumed particular content, or can identify other information associated with the user's consumption of the content. The content consumption source engine 210 or the content consumption sources 210(a)-210(i) can transmit data identifying the content consumed by the user and the additional relevant information to the classifier engine 242.

The classifier engine 242 can receive the data identifying content consumed by the user and can perform analysis on the received data. For instance, the classifier engine 242 can determine a content type for each of the identified content items, for example, by identifying a content item as a movie, album, song, etc. The classifier engine 242 can access additional information relevant to the identified content. Such information can include additional information relevant to the content items, e.g., by identifying one or more entities associated with the content items, identifying information relating to the production of the content items, identifying content items related to the identified content items, identifying other users associated with the user's consumption of the content items, etc.

Based on determining a content type for each of the content items and identifying additional information relevant to the content items, the classifier engine 242 can transmit information identifying the content consumed by the user, the content type associated with each of the content items consumed by the user, and the additional information relevant to the content items consumed by the user. In some instances, as shown in FIG. 2, the classifier engine can transmit the information to the content consumption engine 230.

The content consumption engine 230 can receive the information identifying content consumed by the user and other relevant content, and can store the information as entries in a media consumption history database associated with the content consumption engine 230. In some implementations, the content consumption engine 230 can generate entries at the media consumption history database that correspond to the content items identified as consumed by the user. In some instances, entries generated at the media consumption history database can also include entries that correspond to entities associated with the content items identified as consumed by the user. For example, the media consumption history database generates entries corresponding to the actors or a director of a movie, artists associated with a song or album, writers associated with a magazine or screen play, etc. In some implementations, as described, codes can be assigned to one or more content items consumed by the user and/or entities associated with content items consumed by the user.

For example, based on receiving data from the classifier engine 242, entries 232, 234, and 236 can be generated at the content consumption engine 230 that correspond to content items consumed by a user. For example, based on the television history engine 210(a) determining that the user has viewed the movie "The Social Network," an entry 232 is generated at the content consumption engine 230 that corresponds to the movie "The Social Network." For instance, the entry 232 is associated with the movie "The Social Network," where the movie "The Social Network has been assigned a code "001025," and where the entry 232 includes additional information relating to the movie "The Social Network" and the user's viewing of "The Social Network." As shown, such information includes information identifying one or more cast members of the movie, e.g., the actors "Jesse Eisenberg (123123)" and "Justin Timberlake (001001)," a time when the movie was viewed by the user, e.g., Jan. 1, 2013, a location where the user viewed the movie, e.g., at their home in Washington, D.C., and a source that identified the movie as having been viewed by the user, e.g., a Netflix television history. In other implementations, as described, the entry 232 can include a subset of the information associated with the content item and the consumption of the content item. For example, the entry 232 can identify information associated with the consumption of the movie "The Social Network" by the user, e.g., a time and location where the user watched the movie, and information associated with the content item "The Social Network," e.g., the cast of the movie, can be identified at another source, e.g., at a server that stores information associated with the movie "The Social Network."

Similarly, the entry 234 can be generated at the content consumption engine 230 that corresponds to the album "The 20/20 Experience." For instance, the entry 234 can be associated with the album "The 20/20 Experience," where the album has been assigned a code "101001," and where the entry 234 includes additional information relating to the album "The 20/20 Experience" and the user's consumption of the content. Such information can include, for example, information identifying an artist associated with the album "The 20/20 Experience," e.g., the artist "Justin Timberlake (001001)," a time when the user is identified as having consumed the content, e.g., Mar. 3, 2013, a location where the content was consumed by the user, e.g., "Radio City Music Hall," and a source that identified the content as having been consumed by the user, e.g. a receipt corresponding to a concert ticket purchased by the user to attend a concert by "Justin Timberlake" at "Radio City Music Hall" on Mar. 3, 2013.

As another example, the entry 236 is generated at the content consumption engine 230 that corresponds to the song, "Cheeseburger in Paradise," where the song "Cheeseburger in Paradise" has been assigned the code "776111." The entry 236 also includes information relating to the song "Cheeseburger in Paradise" and the user's exposure to the song "Cheeseburger in Paradise." For example, as shown, in FIG. 2, the song "Cheeseburger in Paradise" is associated with the artist "Jimmy Buffett (701001)," was listened to by the user on Jul. 4, 2013, was listened to at a location called "The American Pub," and was identified as having been consumed by the user based on an audio recognition request.

Requests for information can be received at a query engine 220, and responses to the requests for information can include information associated with entries stored at the media consumption history database that identify content consumed by the user. For example, a user can provide a query at a search engine associated with the query engine 220, and the query engine 220 can submit the terms of the search query to a query analysis engine 244.

The query analysis engine 244 can receive information identifying the terms of the search query, and can identify one or more content items and/or entities associated with the search query. Data identifying the one or more content items and/or entities associated with the query can be submitted to the content consumption engine 130. The content consumption engine 230 can identify content that has been consumed by the user and/or entities associated with content consumed by the user that correspond to the content items and/or entities identified from the search query. For example, content consumed by the user and/or entities associated with content consumed by the user can be identified by accessing entries stored at the media consumption history database that are associated with the user. Information relating to the identified content items consumed by the user and/or entities associated with content items consumed by the user can be transmitted to the query engine 220, e.g., based on the query analysis engine 244 determining the most relevant information to provide to the query engine 220 in response to the search query. The query engine 220 can receive the information, and can provide a response to the search query that identifies content items consumed by the user and/or entities associated with content items consumed by the user that correspond to the search query. In some implementations, the response to the search query can include additional information relating to the content consumed by the user, e.g., a location and time when the user consumed the content.

Figure 3:
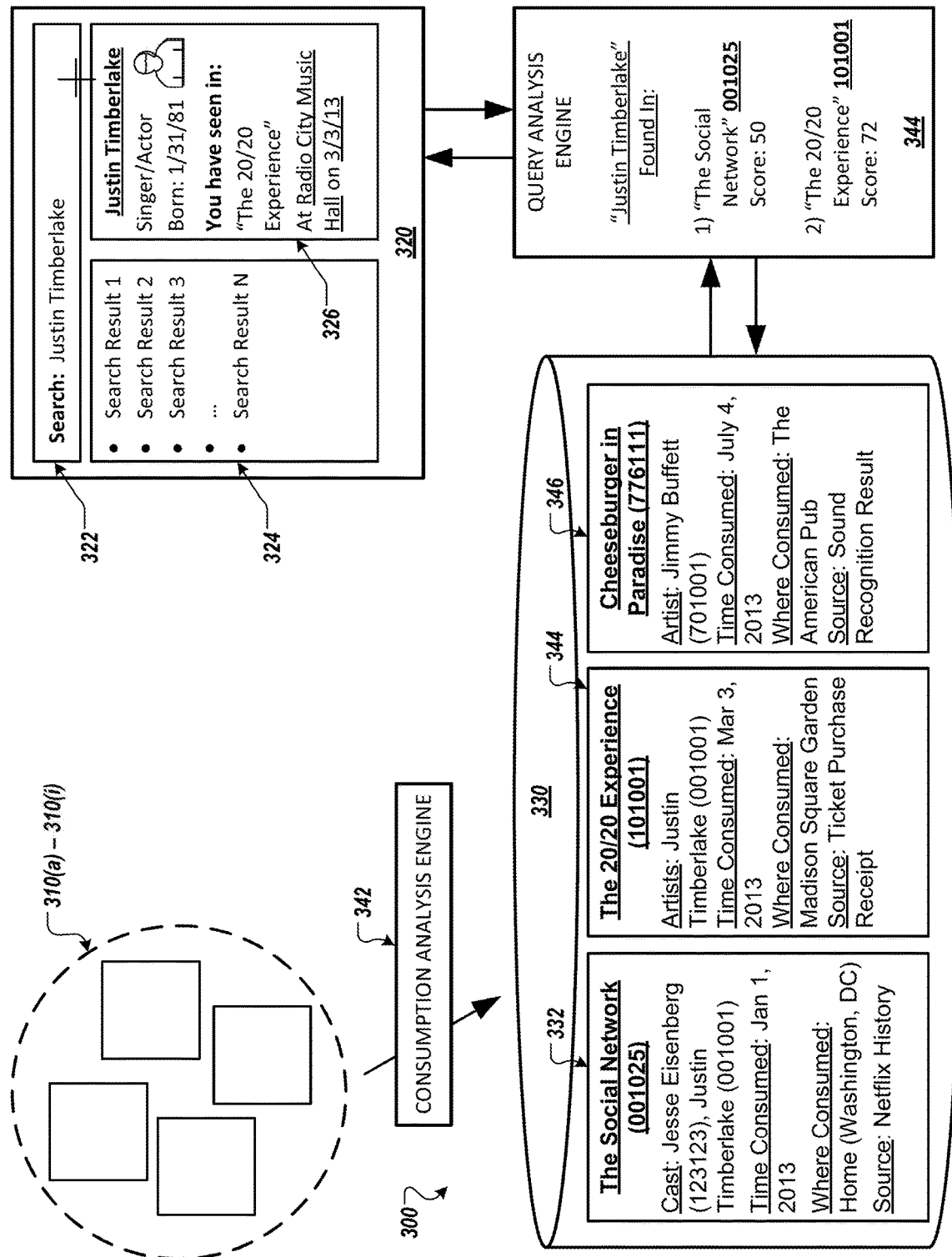

FIG. 3 depicts a portion of an example system 300 for responding to requests for information based on a media consumption history. For example, the system 300 can be capable of receiving a request for information, determining content that has been consumed by a user and/or entities associated with content that has been consumed by the user that relate to the request for information, and providing a response to the request for information that identifies the content and/or entities that correspond to the request for information. As shown, the system 300 includes a query engine 320, a query analysis engine 344, a content consumption engine 330, a classifier engine 342 and one or more content consumption sources 310(a)-310(i). In some instances, the components of the system 300 can perform operations similar to those performed by the system 100.

The content consumption engine 330 can include a media consumption history database that identifies content that has been consumed by a user and/or entities associated with content that has been consumed by the user. For example, as shown in FIG. 3 the content consumption engine 330 can include the entries 332, 334, and 336 identifying the content items "The Social Network," "The 20/20 Experience," and "Cheeseburger in Paradise," that have been consumed by the user. The entries 332, 334, and 336 can be similar to the content items 232, 234, and 236 identified with respect to FIG. 2. As shown, the entries 332, 334, and 336 identify content items consumed by a user, as well as information relating to the content items and/or the user's consumption of the content items. In some instances, the entries 332, 334, and 336 include information that has been received and/or identified by the classifier engine 342 or content consumption sources 310(a)-310(i).

A user can provide a request for information at a query engine 320. For example, a user can access a search engine, e.g., at a webpage that is accessible over the Internet, and can input a search query at a query input field 322 accessible at an interface of the search engine. In one example, the user can input the search query "Justin Timberlake" at the query input field 322 to request information relating to the figure "Justin Timberlake." Based on receiving the input requesting information relating to "Justin Timberlake," the query engine 320 can submit the terms of the query request, for example, by submitting the query request to the query analysis engine 344.

As described, the query analysis engine 344 can receive data from the query engine 320 that includes the terms of the search query, and can identify one or more content items and/or entities associated with the search query. For example, based on receiving the search terms "Justin" and "Timberlake" from the query engine 320, the query analysis engine 344 can identify the entity "Justin Timberlake." In some instances, identifying a particular content item and/or entity associated with a content item can include identifying a code that identifies the content item and/or entity. For example, based on identifying the entity "Justin Timberlake," a code associated with "Justin Timberlake" can be identified, e.g., the code "001001." Based on identifying the entity "Justin Timberlake (001001)," the query analysis engine 344 can communicate with the content consumption engine 330 to identify content items that have been consumed by the user that correspond to the entity "Justin Timberlake (001001)" and/or entities associated with content that has been consumed by the user that correspond to the entity "Justin Timberlake (001001)."

For example, the information associated with the entries 332, 334, and 336 can be accessed to determine which, if any, of the content items associated with the entries 332, 334, and 336 correspond to the entity "Justin Timberlake (001001)." In some instances, entries can be identified that match the entity "Justin Timberlake (001001)" based on matching the entity "Justin Timberlake (001001)" against the names of the entries 332, 334, 336, e.g., by determining if any of the titles of the entries 332, 334, 336 include "Justin Timberlake." In other instances, the entries 332, 334, 336 can be expanded to determine if any of the entries 332, 334, 336 include information that identifies the entity "Justin Timberlake." For example, the entity "Justin Timberlake (001001)" can be matched against the information associated with the entries 332, 334, and 336, e.g., the cast and/or artists associated with the entries 332, 334, 336, or other entities identified as being associated with the entries 332, 334, 336.

Identifying content items and/or entities associated with a search query can further include identifying content items and/or entities that are identified as relevant to a particular query or to responding to a particular query. For example, the query analysis engine 344 can receive data from the query engine 320 that includes terms of a search query, and the query analysis engine 344 can identify one or more content items and/or entities that are relevant to providing a response to the search query. For instance, a user may input the query, "Who is Jessica Biel's husband," and in response to the query, the query analysis engine 344 can identify "Justin Timberlake" as the husband of "Jessica Biel" and/or one or more entities associated with "Justin Timberlake," e.g., one or more movies that feature "Justin Timberlake" that the user has consumed.

In some implementations, the query analysis engine 344 can identify content items and/or entities that are relevant to providing a response to a search query by accessing information that identifies content items and/or entities that correspond to the terms of the search query. For example, the query analysis engine 344 can identify the terms "Jessica," "Biel," and "husband" from a search query, and can access information at the content consumption engine 330 or at another location, e.g., information that is accessible on the Internet, that corresponds to the terms of the search query. Based on accessing the information that corresponds to the terms of the search query, e.g., that indicates that the husband of "Jessica Biel" is "Justin Timberlake," the query analysis engine 344 can access information that identifies content items and/or entities that are relevant to the query and/or to responding to the query, e.g., information that identifies one or more content items that feature "Justin Timberlake" that the user has consumed.

Based on determining that one or more of the entries 332, 334, 336 correspond to the entity "Justin Timberlake (001001)," information identifying the entries that correspond to the entity "Justin Timberlake (001001)" can be received at the query analysis engine 344. For example, the entries 332 and 334, associated with the content items "The Social Network (001025)" and "The 20/20 Experience (101001)," can be identified as entries that correspond to the entity "Justin Timberlake (001001)" identified from the search query. For instance, a determination can be made that "The Social Network (001025)" features "Justin Timberlake (001001)" as an actor, and that "The 20/20 Experience (101001)" features "Justin Timberlake (001001)" as an artist. Based on determining that the entries 332 and 334 are relevant to the entity "Justin Timberlake (001001)," information associated with the entries 332 and 334 can be received at the query analysis engine 344, e.g., the content consumption engine 330 can transmit information associated with the entries 332 and 334 to the query analysis engine 344.

In other implementations, information associated with all of the entries stored at the media consumption history database of the content consumption engine 330 that are associated with the user can be transmitted to the query analysis engine 344, and the query analysis engine 344 can determine which of the entries correspond to the search query. For example, information associated with the entries 332, 334, and 336 can be transmitted to the query analysis engine 344, and the query analysis engine can identify which of the entries 332, 334, and 336 are relevant to the content items and/or entities identified from the search query.

A relevance score can be applied to each of the entries 332, 334, 336 and/or the entries 332, 334 identified as relevant to the search query that indicates an extent to which an entry is relevant to the search query. For example, relevance scores can be determined and assigned to the entry 332 associated with "The Social Network (001025)" and the entry 334 associated with "The 20/20 Experience (101001)" that indicate a relevance of each of the entries to the entity "Justin Timberlake (001001)" identified from the search query. As described, the relevance score applied to the entries 332, 334 can reflect the extent to which the entry relates to the search query, e.g., based on the role of "Justin Timberlake (001001)" in "The Social Network (001025)" and based on the role of "Justin Timberlake (001001)" in "The 20/20 Experience (101001)." For example, an analysis performed by the query analysis engine 344 can determine a relevance score of 50 to assign to the entry 332 associated with the "Social Network (001025)" and a relevance score of 72 to assign to the entry 334 associated with "The 20/20 Experience (101001)." In some implementations, relevance scores can be assigned to all of the entries 332, 334, 336 of the media consumption history database, for example, by assigning a score of zero or another score indicating non-relevance to those entries that are identified as not relating to the search query, e.g., by assigning a score of zero to the entry 336 associated with "Cheeseburger in Paradise (776111)."

Information associated with relevant entries of the media consumption history database, e.g., information associated with the identified entries and the relevance scores assigned to the entries, can be transmitted to the query engine 320, and the query engine 320 can determine relevant information to provide for output in response to the search query. For instance, the query analysis engine 344 can transmit information to the query engine 320 that identifies the content items associated with the entries 332, 334 of the media consumption history database, information associated with the entries 332, 334, and relevance scores assigned to the entries 332, 334. In some implementations, information associated with all of the entries 332, 334, 336 of the media consumption history database and relevance scores assigned to those entries can be transmitted to the query engine 320.

Based on the received information relating to the entries of the media consumption history database and the relevance scores assigned to those entries, the query engine 320 can determine information to output in response to the search query, and can provide a response to the search query to the user. Providing information for output in response to the search query can involve providing information associated with content consumed by the user, e.g., information associated with the entries of the media consumption history database, along with other search query results, e.g., results obtained from the Internet.

In some implementations, the information related to the content consumed by the user can be displayed along with the other search query results, e.g., in the same area of an interface, or can be displayed separately from the other search query results, e.g., in a different area of the interface or at a different interface. For example, the query engine 320 can feature a results field 324 and can provide information for output at the results field 324 that includes both information related to the content consumed by the user that corresponds to the search query and other search query results.

In some implementations, the interface of the query engine 320 can include both a results field 324 and a results panel 326, such that information related to the content consumed by the user is provided for output at the results panel 326 and other results are provided for output at the results field 324. For example, information presented at the results panel 326 can include personal information for the figure "Justin Timberlake," e.g., a profession of "singer/actor" and a birth date of Jan. 31, 1981, as well as information identifying content that the user has consumed that is relevant to the figure "Justin Timberlake," e.g., "The 20/20 Experience" seen at "Radio City Music Hall" on Mar. 3, 2013. In some instances, the information presented at the results panel 326 can be determined based on the relevance scores assigned to the entries of the media consumption history database, e.g., such that the results panel 326 outputs information from one or more of the most relevant entries of the media consumption history database. Thus, information related to the entry 324 corresponding to the content "The 20/20 Experience (101001)" can be provided for output at the results panel 326, while other web results are provided for output at the results field 324.

Figure 4:
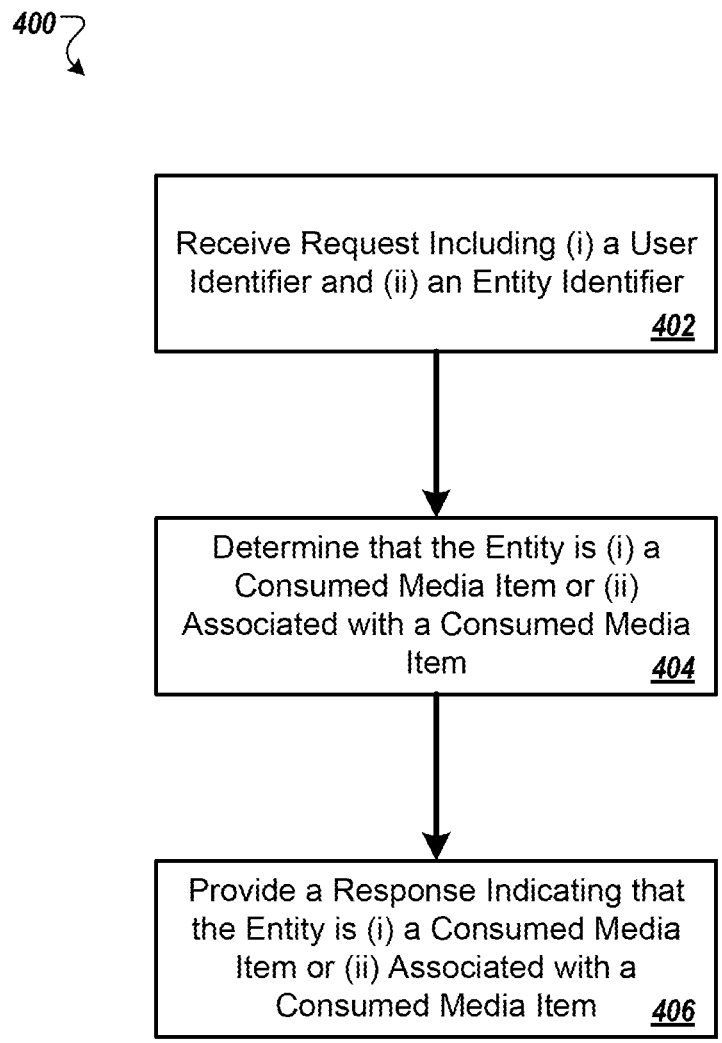
FIG. 4 depicts a flowchart of an example process for responding to requests based on a media consumption history.

FIG. 4 depicts a flowchart of an example process 400 for responding to requests for information based on a media consumption history. For example, the process 400 can be performed by the system 100 in response to a request for information provided by a user.

At step 402, a request is received that includes a user identifier and an entity identifier. For example, the content consumption engine 130 can receive data that includes data identifying a user and data identifying content and/or an entity associated with content. In some instances, the data that identifies the user can be data that identifies the user that input the request for information. The data identifying the user can be, for example, an identifier of a user account associated with the user, or can be another identifier that identifies a particular user or group of users. In some instances, the data that identifies the entity can be data that identifies a particular entity associated with a content item. As described, data that identifies an entity can be data that identifies a content item or an entity associated with a content item that has been identified from the terms of the request for information, e.g., an entity that has been identified from the terms of a search query input at a search engine. For example, the data received at the content consumption engine 130 can be data that identifies a particular user, e.g., a user that input a search query at a search engine, and can include data identifying a particular entity, e.g., the figure "Justin Timberlake" or the movie "The Social Network."

At step 404, a determination is made as to whether the identified entity is a content item that has been consumed by a user or is an entity that is associated with a content item that has been consumed by a user. For example, based on receiving the information identifying the user and the particular entity, a media consumption history database associated with the content consumption engine 130 can be accessed. Entries of the media consumption history database can be identified that are associated with the user, e.g., that identify content consumed by the user and other information associated with the content and/or the consumption of the content by the user. The entity identified from the request for information can then be compared to the entries of the media consumption history database that are associated with the user to determine whether the identified entity is a content item that has been consumed by the user or is an entity that is associated with a content item that has been consumed by the user.

At step 406, based on determining that the identified entity is a content item that has been consumed by the user or is an entity that is associated with a content item that has been consumed by the user, a response is provided that indicates whether the identified entity is a content item that has been consumed by the user or an entity associated with a content item that has been consumed by the user. For example, the content consumption engine 130 can provide a response, e.g., to the query engine 120 or query analysis engine 144, that indicates whether the entity identified from the request for information is a content item that has been consumed by the user or is an entity associated with a content item that has been consumed by the user. In some implementations, as described, the response can include additional information associated with identified content items and/or the user's consumption of identified content items. For example, additional information included with the response may identify times and/or locations where the user consumed the content associated with the entity identified from the search query. Other information may be included with the response, e.g., additional information or different information that is determined based on accessing the media consumption history database associated with the content consumption engine 130.

FIGS. 5-7 and 8A-8D depict a particular implementation that utilizes an established media consumption history to respond to queries that are provided by users of computing devices. Specifically, a user can provide a search query at a device, where the search query identifies a particular entity. For example, the user can provide a search query that references the entity, "The Rolling Stones." The system can identify the entity, "The Rolling Stones," and based on accessing a media consumption history that identifies content consumed by the user, the system can select information related to "The Rolling Stones" to include in a knowledge card. The system can present the knowledge card that includes the selected information in a search results page, where the page can also include one or more search results relevant to the search query, in addition to the knowledge card.

Figure 5:
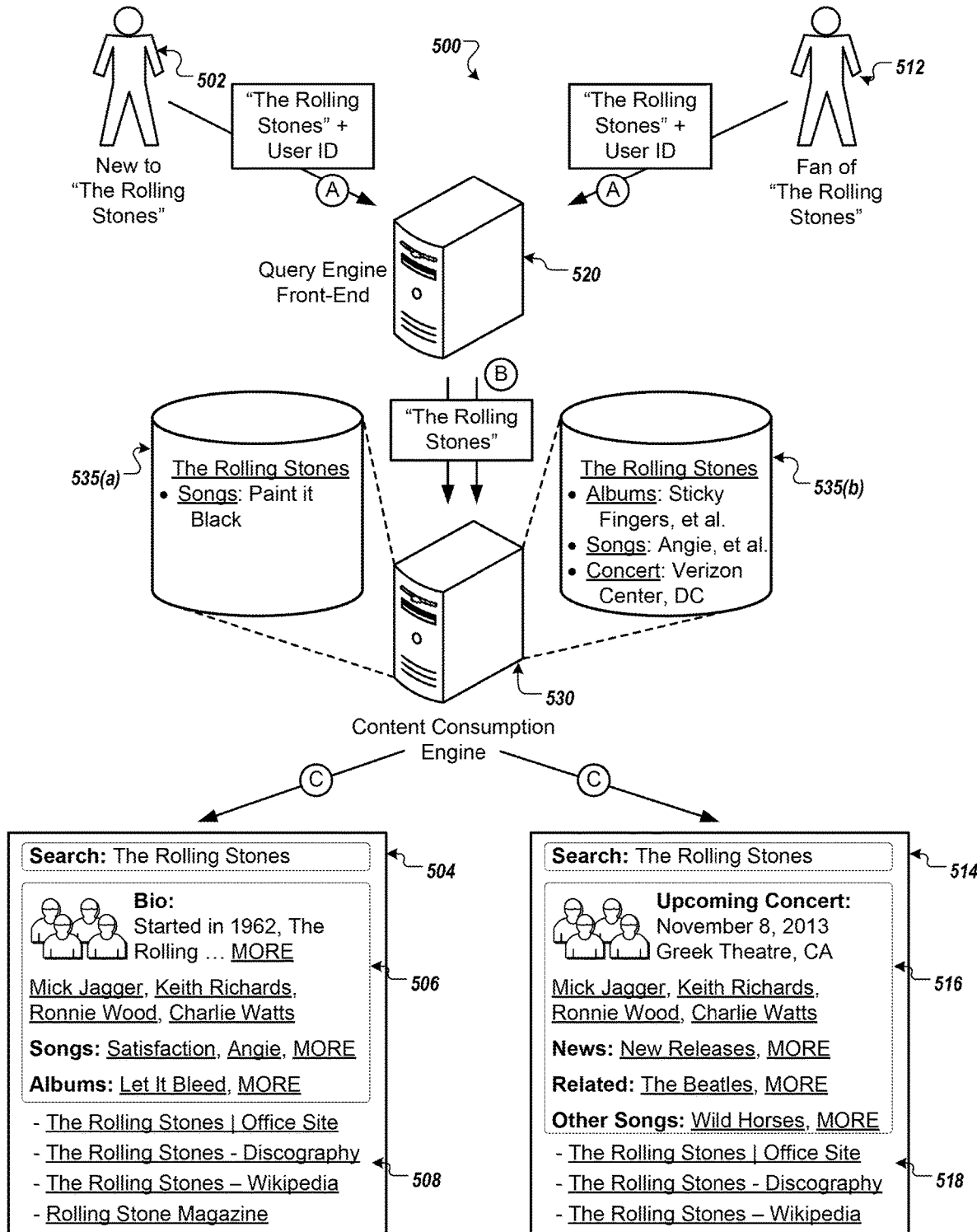
FIG. 5 depicts an example process for providing knowledge cards based on a media consumption history.

FIG. 5 illustrates an example process and system 500 for providing knowledge cards based on a media consumption history. The system 500 can be capable of receiving data that includes a user-input query and data that identifies a particular user. An entity associated with the user-input query can be determined, and items that relate to the identified entity and that have been indicated as consumed by the particular user can be identified. Based on the identified items, the system 500 can select information related to the entity to include in a knowledge card, and the system 500 can provide the knowledge card that includes the selected information in a search results page along with one or more search results that are relevant to the identified entity.

Briefly, the system 500 includes a query engine front-end 520 and a content consumption engine 530. The components of the system 500 can exchange electronic communications over one or more networks or one or more wired or wireless connections. As depicted in FIG. 5, the process associated with providing a knowledge card in response to a user-input query and based on a media consumption history can be accomplished by the system 500.

In one example, during operation (A) of the process for providing knowledge cards in response to user-input queries, the query engine front-end 520 receives data that includes a user-input query and data that identifies a particular user. For example, a user 502 who has had only limited exposure to the band "The Rolling Stones" can provide a query using a client device, such as the query, "The Rolling Stones." The query engine front-end 520 can receive data that includes the query input by the user 502 as well as data identifying the user 502. Based on the received data, the query engine front-end 520 can determine entities associated with the query input by the user 502, e.g., the band "The Rolling Stones," and can identify the user who submitted the query, e.g., the identity of the user 502 who has had only limited exposure to "The Rolling Stones."

The query engine front-end 520 can identify an entity based on the user-input query. For example, the query engine front-end 520 can receive the query, such as the query "The Rolling Stones," from the user 502, and the query engine front-end 520 can determine that the query references the band "The Rolling Stones." In some instances, the query engine front-end 520 can identify an entity associated with a user-input query by comparing terms of the query to one or more keyword phrases and/or by comparing terms of the user input to terms associated with known entities, e.g., to names of entities that are identified in a media consumption history database that includes media consumption histories of multiple users, to names of entities that are identified in a media consumption history associated with the user, or to names of entities that are identified in another database.

In addition to identifying an entity based on the user-input query, the query engine front-end 520 can identify a user identified associated with the user who provided the query. For instance, the query engine front-end 520 can determine an identifier associated with the user 502 who provided the query "The Rolling Stones," e.g., based on the user 502 being logged in to a user account associated with the user 502.

Based on identifying the entity referenced by the user-input query and the identity of the user that submitted the query, the query engine front-end 520 can transmit data that identifies the entity and the user to the content consumption engine 530 during operation (B). For example, the query engine front-end 520 can transmit data to the content consumption engine 530 that identifies the user 502 as well as the band "The Rolling Stones."

The content consumption engine 530 can receive data that identifies a user and an entity referenced by a user-input query, and can access a media consumption history associated with the user to determine items that have been consumed by the user and that are associated with the entity. For example, the content consumption engine 530 can receive data that identifies the user 502 and the entity "The Rolling Stones." Based on receiving the data, the content consumption engine 530 can access a media consumption history 535(a) associated with the user 502 to identify content items that are associated with the "The Rolling Stones" and that have been indicated as consumed by the user 502.

Identifying content items that have been consumed by a user that correspond to an entity identified from a user-input query can involve accessing a media consumption history database associated with the content consumption engine 530. For example, the content consumption engine 530 can maintain a database 535(*a*) that includes entries that identify content items that have been indicated as consumed by the user 502. Based on receiving data identifying "The Rolling Stones" and the user 502, the content consumption engine 530 can identify entries in the media consumption history 535(*a*) belonging to the user 502 that are associated with the "The Rolling Stones." For example, as shown in FIG. 5, the content consumption engine 530 can determine that the user 502 who has had limited exposure to "The Rolling Stones" has only consumed the song "Paint It Black" by "The Rolling Stones," based on accessing the media consumption history 535(*a*) associated with the user 502.

Information to include in a knowledge card can be selected based on identifying content items that have been indicated as consumed by a user and that are associated with the entity referenced by the user-input query. For example, based on determining that the user 502 has only listened to the song "Paint It Black" by "The Rolling Stones," the content consumption engine 530 can select information to include in a knowledge card that can be provided for output to the user 502 in response to the user-input query.

Information included in a knowledge card is selected such that the included information is relevant to the particular user. By identifying items that a user has consumed that are associated with an entity referenced by a user-input query, and selecting information based on identifying the items consumed by the user, the system 500 can present a knowledge card that is specific to the user. For example, based on determining that the user 502 has had limited exposure to "The Rolling Stones," the system 500 can select information that is likely more useful or of greater interest to the user 502, such as biographical information relating to "The Rolling Stones," information identifying members of "The Rolling Stones," and information identifying songs and albums by "The Rolling Stones."

According to some implementations of the described subject matter, information selected for presentation in a knowledge card can include various types of knowledge elements related to an entity referenced by a user-input query. In some instances, knowledge elements related to an entity can include biographical information relating to the entity, can include news or other publications relating to the entity, can include information relating to other entities that are associated with the entity, can include events associated with the entity, can identify or include content related to or produced by the entity, or can include other information that is identified as being relevant to the entity.

For example, information related to "The Rolling Stones" can include biographical information related to "The Rolling Stones," e.g., a biography of "The Rolling Stones," information relating to members of "The Rolling Stones," or information relating to other people associated with "The Rolling Stones," can include information associated with content items relating to "The Rolling Stones," e.g., songs, albums, videos, or other content that feature "The Rolling Stones," can include information associated with other entities that are related to "The Rolling Stones," e.g., information identifying other artists that are similar to "The Rolling Stones," production companies, sponsors, or record labels associated with "The Rolling Stones," can include events or news related to "The Rolling Stones," e.g., upcoming concerts that feature "The Rolling Stones," articles or news stories relating to "The Rolling Stones," or can include any other information that is identified as being related to the entity, "The Rolling Stones."

In some instances, knowledge elements can be associated with content, such as a video, news article, or other content. In some implementations, selecting information to include in a knowledge card can involve selecting particular knowledge elements that have associated content, and including the particular knowledge elements in the knowledge card such that the content associated with a knowledge element can be viewed directly from the knowledge card, e.g., by embedding a video in the knowledge card for viewing by the user. In other implementations, particular knowledge elements can be included in the knowledge card such that the content associated with a particular knowledge element is linked or otherwise made accessible to the user from the knowledge card, e.g., by providing a link to a website associated with the content.

During operation (C), information selected for presentation in a knowledge card can be presented for output to a user. For example, the content consumption engine 530 can select one or more knowledge elements to present to the user 502 in a knowledge card, and can transmit information that causes a knowledge card to be presented to the user 502, where the presented knowledge card includes the selected knowledge elements.

As shown in FIG. 5, a knowledge card can be presented to a user in a user interface that also include one or more search results that are relevant to the entity referenced by the user-input query. For example, a knowledge card 506 can be presented to the user 502 in the user interface 504 along with one or more search results 508 in response to the user 502 inputting the query, "The Rolling Stones" at a client device.

A knowledge card can include information that has been selected based on identifying items consumed by a user that are associated with an entity referenced by a user-input query. For example, the user 502 can provide the query "The Rolling Stones" at a client device associated with the user 502. In response to determining that the user 502 has only consumed the song "Paint It Black" by "The Rolling Stones," e.g., that the user 502 has only a limited knowledge of "The Rolling Stones," the content consumption engine 530 can select, as information to include in a knowledge card, information associated with a biography of "The Rolling Stones," information that identifies the members of "The Rolling Stones," information that identifies songs by "The Rolling Stones," and information that identifies albums by "The Rolling Stones." The selected information can be presented to the user 502 in the knowledge card 506 that is included in the user interface 504. As described, FIG. 5 illustrates that queries provided by different users can result in different content being included in knowledge cards presented in response to the queries. For instance, FIG. 5 illustrates another example in which a user 512 who has had extensive exposure to the band "The Rolling Stones" inputs a query that references "The Rolling Stones." During operation (A) of the process for providing a knowledge card in response to a user-input query, the query engine front-end 520 receives data that includes the user input query that references "The Rolling Stones," and data that identifies the user 512. The query engine front-end 520 receives the data that includes the query input by the user 512 as well as the data identifying the user 512, and determines entities associated with the query input by the user 512, e.g., the band "The Rolling Stones," as well as an identity of the user 512.

Based on identifying the entity referenced by the user-input query and the identity of the user 512 that submitted the query, the query engine front-end 520 transmits data that identifies the entity and the user 512 to the content consumption engine 530 during operation (B). The content consumption engine 530 receives the data identifying the user 512 and the data identifying the entity, "The Rolling Stones," referenced by the query input by the user 512, and accesses a media consumption history 535(b) associated with the user 512 to determine items that have been indicated as consumed by the user 512 and that are associated with "The Rolling Stones." For example, based on information provided by the user 512, the content consumption engine 530 can identify music albums performed by "The Rolling Stones" that have been indicated as having been consumed by the user 512, e.g., the album "Sticky Fingers," can identify songs performed by "The Rolling Stones" that have been indicated as having been consumed by the user 512, e.g., the song "Angie," and can identify concerts that the user 512 has indicated that they have attended or will attend that feature "The Rolling Stones," e.g., a concert at the "Verizon Center" in Washington, D.C. that featured "The Rolling Stones." Information to include in a knowledge card can be selected based on identifying the items that have been indicated as consumed by the user 512 and that are associated with "The Rolling Stones,"

During operation (C), information selected for presentation to the user 512 in a knowledge card is presented to the user 512 in the knowledge card 516. For instance, the knowledge card 516 is presented to the user 512 in the user interface 514, and can include information identifying an upcoming concert that features "The Rolling Stones," information that identifies the members of "The Rolling Stones," information related to recent news that involves "The Rolling Stones," information identifying artists that are similar or related to "The Rolling Stones," and information identifying other songs by "The Rolling Stones" that the user 512 may not have listened to previously.

Figure 6:
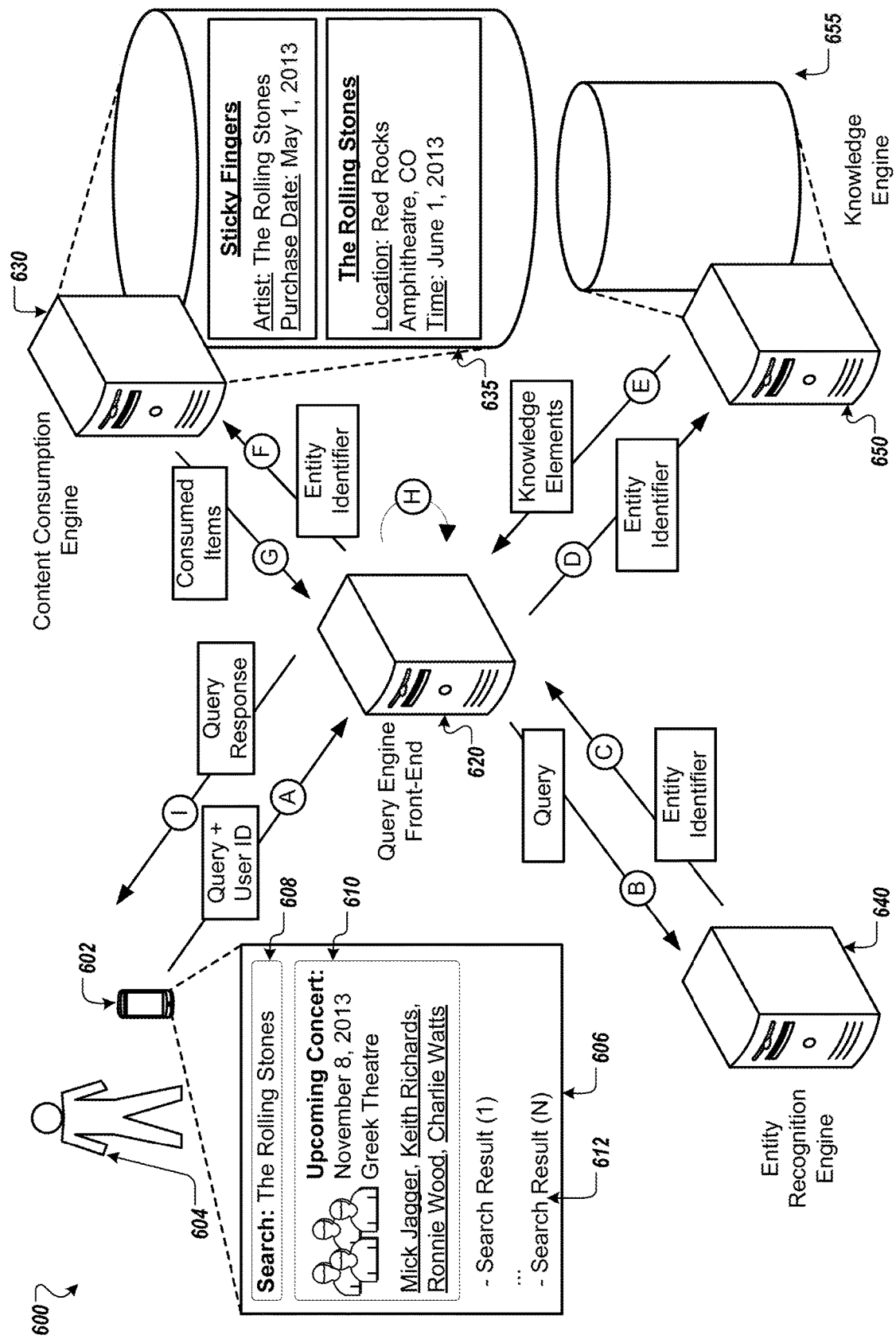
FIG. 6 depicts an example system for providing knowledge cards based on a media consumption history.

FIG. 6 depicts a system 600 for providing knowledge cards based on a media consumption history. Specifically, the system 600 addresses an implementation in which a query is received from a user, and a knowledge card is provided in response to the user-input query, where information presented in the knowledge card is dependent upon a media consumption history of the user.

Briefly, the system 600 can receive a query, such as a natural language query input by a user, and can identify an entity referenced by the query. The system 600 can identify items that have been consumed by the user that are associated with the entity, and can select information to present in a knowledge card that is related to the entity based on identifying the items. A knowledge card that includes the selected information can be provided for output to the user, such as by providing the knowledge card in a search results page that includes one or more web search results that are relevant to the query. The system 600 includes a client device 602, query engine front-end 620, a content consumption engine 630, an entity recognition engine 640, and a knowledge engine 650. The components of the system 600 can each be in communication over one or more networks, such as one or more LAN or WAN, or over one or more wired or wireless connections.

During operation (A), the query engine front-end 620 receives data identifying a user and data encoding a query input by the user. For example, the user 604 can provide the query, "The Rolling Stones," at the client device 602, and data encoding the query and data identifying the user 604 can be received by the query engine front-end 620. In some implementations, the query engine front-end 620 can receive the data encoding the user-input query and data identifying the user over one or more networks, or over one or more other wireless or wired connections.

The client device 602 can be a mobile computing device, such as a mobile phone, smart phone, personal digital assistant (PDA), music player, e-book reader, tablet computer, a wearable computing device, laptop computer, desktop computer, or other portable or stationary computing device. The client device 602 can feature a microphone, keyboard, touchscreen, or other interface that enables the user 604 to input a query at the device. In some implementations, the user 604 can provide the query at an interface that is presented or accessible from the client device 602. For example, the user 604 can enter the query at a search engine that is accessible at the client device 602, can enter the query at a database that is accessible at the client device 602, or can provide the query at any other interface that features search capabilities, e.g., at a social network interface.

The user 604 can provide a natural language query at the client device 602, such as by speaking one or more terms of a query, typing one or more terms of a query, selecting one or more terms of a search query, e.g., from a menu of available terms, selecting a query that comprises one or more terms, e.g., from a menu of available queries, or by providing a query using any other method. In other implementations, the user 604 can provide a query using another method, for example, by selecting or submitting an image that the user would like to search for, by providing an audio or video sample of content that a user would like to search for, or by otherwise inputting a query at the client device 602.

In addition to the data associated with the user-input query, data transmitted by the client device 602 to the query engine front-end 620 additionally includes information that identifies the user 604. For example, a user can be identified based on the user being logged in to a user account, or based on other information that can identify the user. Data that identifies the user 604 and that includes a query input by the user 604 can be received by the query engine front-end 620 in a single data packet or in multiple data packets. The data that identifies the user and the data associated with the user-input query can further be received simultaneously, or can be received separately at different times.

Based on receiving the data identifying the user 604 and the data associated with the user-input query, the query engine front-end 620 can transmit data associated with the user-input query to the entity recognition engine 640, and the entity recognition engine 640 can identify an entity associated with the user-input query during operation (B). For example, based on receiving data that identifies the user and the user-input query, "The Rolling Stones," the query engine front-end 620 can extract the data associated with the user-input query, "The Rolling Stones," and can transmit data associated with the query to the entity recognition engine 640.

The entity recognition engine 640 can receive the information associated with the user-input query, and can identify an entity associated with the query. For example, the entity recognition engine 640 can receive information associated with the query, "The Rolling Stones," and can identify an entity associated with the query as the band, "The Rolling Stones."

In some implementations, the entity recognition engine 640 can identify an entity associated with a query by comparing terms of the query to terms associated with a set of known entities. For example, the query received by the entity recognition engine 640 can be a natural language query, e.g., the query, "The Rolling Stones," and the entity recognition engine 640 can identify the entity "The Rolling Stones" as being associated with the query based on comparing the terms of the query to terms associated with a set of known entities. In some implementations, a known set of entities can be accessible to the entity recognition engine 640 at a database, such as a database that is associated with the entity recognition engine 640 or that is otherwise accessible to the entity recognition engine 640, e.g., over one or more networks.

In some instances, as described, a user-input query can be a spoken voice query, e.g., a query input by the user 604 by speaking into a microphone associated with the client device 602. In such instances, the query engine front-end 620 can transmit the data encoding the spoken voice query provided by the user 604 to the entity recognition engine 640, and the entity recognition engine 640 can obtain a transcription of the spoken voice query. For example, the query recognition engine 640 can be associated with or have access to an automatic speech recognition (ASR) engine, and can obtain a transcription of the spoken voice query based on submitting the data encoding the spoken voice query to the ASR engine. The query recognition engine 640 can obtain a transcription of the spoken voice query, and can identify an entity associated with the query by comparing terms of the transcription to terms associated with a set of known entities.

In some implementations, the entity recognition engine 640 can identify an entity associated with a query by submitting the terms of the query to a search engine or by submitting the terms of the query to a database, and can identify an entity associated with the query based on the results of providing the terms of the query to a search engine or as a query to the database. For example, the entity recognition engine 640 can submit the terms "The Rolling Stones" to a search engine, and can identify, as the entity referenced by the user-input query, an entity identified in results returned by the search engine. In some instances, the entity identified as associated with the user-input query can be the entity that is identified as the top search result, can be the entity that is the most prominent of the entities included in the search results, or can be identified from the search results in another way.

In some instances, the entity recognition engine 640 may identify more than one entity that may be referenced by a query input by the user 604, and the entity recognition engine 640 may select a single entity from among the possible entities. For example, based on receiving the query "The Rolling Stones," the entity recognition engine 640 may determine that the query potential references either the band "The Rolling Stones" or the magazine "Rolling Stone." The entity recognition engine 640 can select a particular entity, such as the entity "The Rolling Stones" as the entity referenced by the user-input query.

Selecting a particular entity as being referenced by the user-input query from among multiple potential entities can involve additional analysis performed by the entity recognition engine 640. In some implementations, the entity recognition engine 640 can determine how similar the terms of the user-input query are to the terms associated with the potential entities, and can select the entity that is the nearest match to the query terms as the entity. For example, the entity recognition engine 640 can determine that the user-input query "The Rolling Stones," can possibly reference the band "The Rolling Stones," the magazine "Rolling Stone," or the record label "Rolling Stone Records." Based on determining that the terms of the query "The Rolling Stones," best matches the band "The Rolling Stones," the entity recognition engine 640 can select the band "The Rolling Stones" as the entity referenced by the user-input query.

In other implementations, the entity recognition engine 640 can determine the entity that is the most frequently queried of the potential entities, and can select the most frequently queried entity as the entity referenced by the user-input query. For example, the entity recognition engine 640 can determine that the user-input query "The Rolling Stones," can possibly reference the band "The Rolling Stones," the magazine "Rolling Stone," the album "The Rolling Stones," or the record label "Rolling Stone Records." Based on determining that the most users query the band "The Rolling Stones," or that the majority of queries reference the band "The Rolling Stones," the entity recognition engine 640 can select the band "The Rolling Stones" as the entity referenced by the user-input query.

In still other implementations, the entity recognition engine 640 can determine an importance measure or popularity measure associated with the potential entities, and can select the most important or most popular of the potential entities as the entity referenced by the user-input query. For example, the entity recognition engine 640 can determine a number of resources, e.g., websites, entries, content items, posts, etc., that are associated with each of the potential entities, and can determine a level of importance or popularity for each of the potential entities based on the number of resources associated with the entities. For instance, the band "The Rolling Stones" may be associated with a greater number of websites, news articles, and posts than the record label "Rolling Stone Records," and therefore the band "The Rolling Stones" may have a greater measure of importance or popularity than "Rolling Stone Records." Based on the band "The Rolling Stones" having a greater measure of importance or popularity, the entity recognition engine 640 can identify the band "The Rolling Stones" as the entity referenced by the user-input query.

In some implementations, terms of a user-input query may be used to disambiguate between multiple potential entities. For example, the entity recognition engine 640 can identify multiple potential entities associated with a user-input query and can further identify terms of a query that match one or more keyword phrases. Based on determining that the terms of the query match a particular keyword phrase, the entity recognition engine 640 can identify a particular entity as being referenced by the query. For example, a user-input query may be "Rolling Stone band," and the entity recognition engine 640 may identify multiple potential entities referenced by the query, such as the band "The Rolling Stones," the magazine "Rolling Stone," and the record label "Rolling Stone Records." Based on determining that the term "band" included in the query matches a keyword phrase, and based on determining that the keyword phrase is associated with an artist or musician entity type, the entity recognition engine 640 can identify the band "The Rolling Stones" as the entity referenced by the query.

Identifying an entity referenced by a user-input query can, in some implementations, further involve identifying an entity identifier associated with the entity. For example, entities may be associated with a code or other identifier that uniquely identifies the entity, e.g., an alphanumeric code that identifies the entity, and identifying a particular entity as referenced by a query can include identifying the code or other identifier that is associated with the entity. For instance, the band "The Rolling Stones" may be associated with an alphanumeric code that identifies the band "The Rolling Stones," and based on identifying the entity "The Rolling Stones," the entity recognition engine 640 may further identify the alphanumeric code associated with the entity "The Rolling Stones."

Based on identifying an entity that is referenced by the user-input query, the entity recognition engine 640 can transmit data that identifies the entity to the query engine front-end 620 during operation (C). For example, the entity recognition engine 640 can identify the entity referenced by the query that was input by the user 104 as the band "The Rolling Stones," and can transmit data to the query engine front-end 620 that identifies the entity. In some implementations, the entity recognition engine 640 can additionally determine an identifier that is associated with the referenced entity, and can transmit data that includes the entity identifier to the query engine front-end 620 in addition to, or in lieu of, transmitting the data that identifies the referenced entity. The entity recognition engine 640 can transmit the data identifying the referenced entity and/or the entity identifier to the query engine front-end 620 over one or more networks or wired or wireless connections.

At operation (D), the query engine front-end 620 can receive the data identifying the entity referenced by the user-input query, and can transmit the data identifying the entity to the knowledge engine 650. For example, the query engine front-end 620 can receive information identifying the entity referenced by the user-input query as the band "The Rolling Stones," and can transmit data to the knowledge engine 650 that identifies "The Rolling Stones." In some instances, the query engine front-end 620 can transmit the data identifying the referenced entity to the knowledge engine 650 over one or more networks, or wired or wireless connections.

The knowledge engine 650 can receive the data identifying the referenced entity, and can identify one or more knowledge elements that are related to the entity. As described, knowledge elements related to an entity can include any information that is related to the referenced entity or to entities that are associated with the referenced entity. For example, knowledge elements can include informational knowledge elements, e.g., biographical information associated with an entity, can include content knowledge elements, e.g., pictures, videos, or audio that are associated with or feature an entity, resource knowledge elements, e.g., websites or social network pages that are associated with an entity, relationship knowledge elements, e.g., information that indicates how an entity is associated with one or more other entities, can include news knowledge elements, e.g., articles or posts that feature or relate to the entity, or can include any other information type that can be represented or presented in a user interface of a computing device.

In some implementations, the knowledge engine 650 can identify knowledge elements related to an identified entity based on accessing a database or server that maintains knowledge elements relating to entities. For example, the knowledge engine 650 can receive information that identifies the entity "The Rolling Stones," and the knowledge engine can access the database or server to identify knowledge elements that are associated with the entity "The Rolling Stones." In some implementations, the database or server accessed by the knowledge engine 650 can be a database or server that is associated with the knowledge engine 650, e.g., as a part of the knowledge engine 650, or the knowledge engine 650 can access the database or server, e.g., over one or more networks.

The database or server can store knowledge elements that relate to various entities, and the knowledge engine 650 can obtain or identify knowledge elements that are related to the entity referenced by the query input by the user 604. For example, the knowledge engine 650 can identify knowledge elements that are related to the band "The Rolling Stones" at the database or server. The knowledge engine 650 can identify the related knowledge elements based on performing a search of the database or server for knowledge elements that are related to "The Rolling Stones" or by performing a search for knowledge elements that are related to an entity identifier that uniquely identifies "The Rolling Stones." In other implementations, the knowledge engine 650 can identify the related knowledge elements by accessing entries at the database or server that are distinctly related to the identified entity. For example, the database or server may maintain a folder or other data store that includes knowledge elements related to "The Rolling Stones," and the knowledge engine 650 can obtain or identify the knowledge elements related to "The Rolling Stones."

In some implementations, knowledge elements relating to entities can include information that is accessed by the database or server, or that is transmitted to and stored by the database or server. For example, information that is identified as being related to a particular entity can be stored at the database or server as a knowledge element relating to the entity. For instance, a video relating to "The Rolling Stones" and a news article relating to "The Rolling Stones" can be identified and stored at the database or server as knowledge elements that relate to "The Rolling Stones." In some instances, the video and the news article can be identified by the database or server, e.g., based on performing a periodic web search for "The Rolling Stones" or based on determining that new content relating to "The Rolling Stones" is available on the web, or the video and the news article can be stored to the database or server as being related to "The Rolling Stones," e.g., based on a moderator or user of the system 600 providing information to the database or server that identifies the video and news article as relating to "The Rolling Stones."

In some implementations, the knowledge engine 650 can obtain or identify knowledge elements related to an identified entity based on providing a query for the entity and receiving query results that are identified as being related to the entity. For instance, the knowledge engine 650 can provide a query to a search engine or other searchable resource for "The Rolling Stones," and can receive query results. The knowledge engine 650 can identify one or more of the query results as knowledge entities associated with the identified entity. In some instances, the knowledge engine 650 may be able to identify a subset of information included in a search result as a knowledge element or as being representative of the knowledge element, e.g., by crawling resources related to the search results and extracting portions of the resources that are identified as being the most relevant to the entity referenced by the user-input query.

In some implementations, knowledge elements relating to entities can be associated with one or more attributes. In some instances, attributes associated with knowledge elements can be stored in metadata associated with the knowledge elements, can be stored within the knowledge element content, or can otherwise be stored in association with the knowledge element, e.g., in a data store that stores the attributes in a data table or other construct such that the attributes are associated with the knowledge elements.

Attributes associated with a knowledge element can include an element type associated with the knowledge element. For example, a knowledge element may be identified as an informational knowledge element, e.g., relating to biographical information for the entity, as a content knowledge element, e.g., image, video, or audio associated with the entity, as a resource knowledge element, e.g., a website associated with the entity, as a relationship knowledge element, e.g., that identifies other entities related to the identified entity, as a news knowledge element, e.g., a post or article about the entity, or can be categorized as another element type.

Attributes associated with a knowledge element can also include a rank score associated with the knowledge element. For instance, a knowledge element may be assigned a rank score based on numerous factors, and the rank score may be associated with the knowledge element. Such factors can include, for example, how recently the knowledge element was generated or obtained, e.g., how recently a news article was published, can include how popular or important the knowledge element is deemed to be, e.g., based on how many views or clicks the knowledge element or a resource associated with the knowledge element has received, can include how fundamental the knowledge element is to the entity, e.g., whether the knowledge element is associated with basic biographical information such as an age of an entity or a location of a place, or can include other factors. In some instances, the knowledge engine 650 may assign the rank score to the knowledge element, or the rank score can be assigned to the knowledge element by another system or assigned to the knowledge item by a person, e.g., a moderator or user of the system 600.

Other attributes can be associated with a knowledge element and stored in association with the knowledge element. For example, other attributes associated with a knowledge element can include a data associated with the knowledge element, a location associated with the knowledge element, a file size and/or physical display size associated with the knowledge element, a summary of the knowledge element, or other information pertinent to the knowledge element or to providing the knowledge element for display in a knowledge card.

Based on identifying the one or more knowledge elements, the knowledge engine 650 can transmit data that identifies the knowledge elements identified for the referenced entity to the query engine front-end 620 during operation (E). For example, the knowledge engine 650 can obtain and/or identify one or more knowledge elements that are related to the band "The Rolling Stones," and can transmit data to the query engine front-end 620 that includes or identifies the knowledge elements. The knowledge engine 650 can transmit the data that includes or identifies the knowledge elements to the query engine front-end 620 over one or more networks or wired or wireless connections. The query engine front-end 620 can receive the data that includes or identifies the knowledge elements from the knowledge engine 650.

At operation (F), the query engine front-end 620 can transmit data identifying the entity referenced by the user-input query to the content consumption engine 630. For example, the query engine front-end 620 can receive information identifying the entity referenced by the query input by the user 604 as the band "The Rolling Stones," and the query engine front-end 620 can transmit data to the content consumption engine 630 that identifies "The Rolling Stones." Additionally, in some instances, the query engine front-end 620 can transmit data that includes an identifier of the user 604, where the user identifier uniquely identifies the user 604. In some instances, the query engine front-end 620 can transmit the data identifying the referenced entity, and optionally the data identifying the user 604, to the content consumption engine 630 over one or more networks, or wired or wireless connections.

The content consumption engine 630 can receive the data identifying the entity referenced by the user-input query, and can identify one or more items that have been indicated as consumed by the user 604 and that are associated with the referenced entity. For example, the content consumption engine 630 can receive information identifying the band "The Rolling Stones," and the content consumption engine 630 can identify one or more items that have been indicated as consumed by the user 604 and that are associated with the band "The Rolling Stones" by accessing a content database 635 that identifies items that have been indicated as consumed by the user 604. For example, the content consumption engine 630 can access the content database 635 and can identify the album "Sticky Fingers" and a concert that featured "The Rolling Stones" that have been indicated as consumed by the user 604 and that are both associated with the band "The Rolling Stones." In some implementations, the content consumption engine 630 can receive data from the query engine front-end 620 that uniquely identifies the user 604, and the content consumption engine 604 can identify the items that have been indicated as consumed by the user 604 and that are associated with the referenced entity by identifying the content database 635 that is associated with the user 604 and accessing the contents of the content database 635. The content consumption engine 630 can identify the items that have been indicated as consumed by the user 604 and that are associated with "The Rolling Stones" using the techniques described with respect to FIGS. 1-3.

In some implementations, in addition to identifying items that have been indicated as consumed by the user 604 and that are associated with the referenced entity, the content consumption engine 630 can access additional information associated with the identified items and/or the consumption of the identified items by the user 604. For example, as described, the content consumption engine 630 can identify entities associated with the identified items, can access summaries or biographical information of the identified items, or can access other information associated with the identified items. The content consumption engine 630 can also access information associated with the consumption of the identified items by the user 604, such as locations where the user 604 consumed the identified items, times and dates when the user 604 consumed the identified items, information indicating how the user 604 consumed the identified items, or information indicating how the system 600 determined that the user 604 consumed the identified items.

In some implementations, the content consumption engine 630 can identify items that have been consumed by users other than the user 604. For instance, the content consumption engine 630 can identify one or more users having media consumption histories that include entries that identify the entity referenced by the user-input query, and the content consumption engine 630 can identify items that have been consumed by the one or more other users. In other instances, the content consumption engine 630 can identify one or more other users that have provided the same query as the user 604, e.g., that have also provided the query "The Rolling Stones," and can identify items that have been consumed by the one or more other users. In some instances, the content consumption engine 630 can identify items that have been consumed by the one or more other users that are associated with the referenced entity, e.g., other songs by "The Rolling Stones" that the user 604 has not consumed but that has been consumed by other users, can identify items that have been consumed most frequently by the one or more other users, e.g., a song or movie that has been consumed by a majority of the other users regardless of whether the user 604 has consumed the song or movie, or can identify other items that have been consumed by the one or more other users. Identifying the one or more other users and items consumed by the one or more other users may enable the system 600 to provide relevant information to the user 604 in a knowledge card since the user 604 and the other users have the referenced entity in common, e.g., by enabling the system 600 to present the user 604 with information identifying other entities that the user 604 may be interested in.

The content consumption engine 630 can identify the one or more items that have been indicated as consumed by the user 604 and that are associated with the entity referenced by the user-input query, and can transmit data identifying the one or more items to the query engine front-end 620 during operation (G). In some instances, the content consumption engine 630 can transmit additional information associated with the identified items to the query engine front-end 620. For example, the content consumption engine 630 can transmit data to the query engine front-end 620 that identifies the album "Sticky Fingers" and that identifies the concert attended by the user 604 that featured "The Rolling Stones." The data provided by the content consumption engine 630 to the query engine front-end 620 can further include information indicating that the user purchased the album "Sticky Fingers" on a particular date, e.g., on May 1, 2013, and/or that the user 604 attended the concert featuring "The Rolling Stones" on a particular date and at a particular location, e.g., on Jun. 1, 2013 at "Red Rocks Amphitheatre." According to some implementations, the content consumption engine 630 can transmit the data identifying the one or more items that have been indicated as consumed by the user 604 and that are associated with the referenced entity to the query engine front-end 620 over one or more networks, or wired or wireless connections.

The query engine front-end 620 can receive data identifying the one or more items that have been indicated as consumed by the user 604 and that are associated with the entity referenced by the query. The query engine front-end 620 can select knowledge elements to include in a knowledge card based on the one or more identified items during operation (H). In some implementations, selecting knowledge elements to include in a knowledge card can include performing additional analysis with respect to the identified knowledge elements, information associated with the identified knowledge elements, and/or information associated with the one or more items that are identified as having been consumed by the user 604 and that are associated with the referenced entity.

In some implementations, selecting one or more of the identified knowledge elements to include in a knowledge card can involve assigning and/or adjusting rank scores associated with the knowledge elements, and selecting one or more of the knowledge elements to include in a knowledge card based on the assigned or adjusted rank scores. In some instances, selecting knowledge elements to include in a knowledge card can include selecting a particular number of knowledge elements that are assigned the highest, or alternatively the lowest, rank scores. In other instances, selecting knowledge elements to include in a knowledge card can include selecting all or a particular number of knowledge elements that are associated with assigned or adjusted rank scores that satisfy a rank score threshold, or can involve selecting knowledge elements based on the assigned or adjusted rank scores and one or more other criteria.

Rank scores associated with the knowledge elements can be assigned and/or adjusted based on identifying the one or more items in the media consumption history of the user 604. For example, a level of familiarity of the user 604 with the referenced entity can be determined, e.g., based on a number of items that the user 604 has consumed that are associated with the entity, and rank scores associated with knowledge elements relating to the referenced entity can be assigned and/or adjusted based on the level of familiarity of the user 604 with the entity. For example, based on determining that the user 604 has a low familiarity with band "The Rolling Stones," rank scores associated with informational knowledge elements related to "The Rolling Stones," e.g., knowledge elements associated with biographical information for "The Rolling Stones," may be increased, while rank scores associated with news knowledge elements that relate to "The Rolling Stones," e.g., knowledge elements associated with news articles that relate to "The Rolling Stones," may be decreased. Conversely, if the user 604 is determined to have a high familiarity with "The Rolling Stones" based on the items identified by content consumption engine 630, rank scores associated with news knowledge elements relating to "The Rolling Stones" may be increased, while rank scores associated with informational knowledge elements relating to "The Rolling Stones" may be decreased.

Determining a level of familiarity of a user with an entity that is referenced by a user-input query can involve determining a number of items associated with the entity that the user has consumed, and/or can involve determining a number of items of different item types that the user has consumed. For example, a user that has consumed a small number of items that are associated with the referenced entity, e.g., a user that has only consumed a single song by "The Rolling Stones," may be identified as having a low level of familiarity with the entity. A user that has consumed a larger number of items that are associated with the referenced entity, e.g., a large number of songs or albums by "The Rolling Stones," may be identified as having a medium or high level of familiarity with the entity. In some instances, item types associated with items consumed by the user can be used to determine the level of familiarity of the user with the entity. For example, two users may be identified as only having consumed a single item associated with "The Rolling Stones." Based on determining that the item consumed by one of the users consumed was a song by "The Rolling Stones," and determining that the item consumed by the other of the users was a biography of "The Rolling Stones," the first user can be determined as having a low familiarity with "The Rolling Stones," while the other user can be determined as having a medium or high level of familiarity with "The Rolling Stones."

In some implementations, a level of familiarity of a user with an entity that is referenced by a user-input query can include determining the how recently the user consumed one or more entities that feature the entity. For example, a user that has consumed a large number of content items that feature "The Rolling Stones" within a short period of time may be identified as having a medium or high level of familiarity with "The Rolling Stones." Alternatively, a user that has consumed a similar number of content items that feature "The Rolling Stones" over a long period of time or at a time further in the past may be identified as having a low level of familiarity with "The Rolling Stones."

In some implementations of the described subject matter, determining a level of familiarity of a user with an entity that is referenced by a user-input query can include determining the prominence of the entity in one or more content items that have been indicated as consumed by the user. The user's level of familiarity with the entity can then be determined based on the content items that have been identified as consumed by the user and the prominence of the entity in those content items. For example, a user that has viewed an episode of a television show that includes a segment featuring "The Rolling Stones" may be identified as having a lower level of familiarity with "The Rolling Stones" than a user who has viewed a biography of "The Rolling Stones."

Rank scores can be assigned and/or adjusted based on element types associated with the knowledge elements and based on item types of the items identified in the media consumption history of the user 604 that are associated with the entity. For example, based on determining that the user 604 has consumed a large number of songs by "The Rolling Stones" but has not consumed many videos that feature "The Rolling Stones," assigned or adjusted rank scores associated with knowledge elements that identify or include songs by "The Rolling Stones" may be lower than assigned or adjusted rank scores associated with knowledge elements that identify or include videos that feature "The Rolling Stones."

Other factors can be considered when assigning and/or adjusting rank scores associated with knowledge elements. In some implementations, rank scores associated with knowledge elements can be assigned and/or adjusted based on determining how recently the information was released. For example, a knowledge element associated with a news article that was published within the past month may have an assigned or adjusted rank score that is higher than a knowledge element associated with a news article that was published six months ago.

In some implementations, rank scores associated with knowledge elements can be assigned and/or adjusted based on based on determining a quality of the information associated with the knowledge element. For example, the knowledge engine 650 or the query engine front-end 620 can determine a number of views, e.g., web hits, that information associated with a knowledge element has received, a number of posts mentioning the information associated with the knowledge element, links to the information associated with the knowledge element, and/or a number of links that the information associated with the knowledge element has to other resources or information. Knowledge elements associated with information that have received more views, a greater number of mentions in posts, a greater number of links to the information, and/or a greater number of links to other resources or information can be identified as being of a higher quality than knowledge elements associated with information receiving fewer views and mentions, and that are associated with fewer links. A rank score associated with knowledge element can be assigned and/or adjusted based on the determined quality of the knowledge element, for example, such that higher quality knowledge elements are assigned higher rank scores than lower quality knowledge elements.

In some implementations, rank scores associated with knowledge elements can be assigned and/or adjusted based on identifying items that are included in the media consumption histories of multiple users. For example, as described with respect to operation (F) of FIG. 6, based on identifying the entity "The Rolling Stones" from a query provided by the user 604, the content consumption engine 630 can identify other users that have also submitted queries that identify the "The Rolling Stones" and/or can identify other users having media consumption histories that identify one or more items that are associated with "The Rolling Stones." The content consumption engine 630 can identify items that the other users have consumed, and rank scores associated with knowledge elements can be assigned and/or adjusted based on the items identified in the media consumption histories of the other users.

For example, based on identifying "The Rolling Stones" from a query provided by the user 604, the content consumption engine 630 can access media consumption histories associated with other users that have provided queries for "The Rolling Stones" or that have items identified in their media consumption histories that are associated with "The Rolling Stones." The query engine front-end 620 can receive information from the content consumption engine 630 identifying items included in the media consumption histories of the other users, and can assign and/or adjust rank scores associated with the knowledge elements based on identifying the items in the media consumption histories of the other users. For instance, based on determining that users having media consumption histories that identify items associated with "The Rolling Stones" also frequently have items associated with "The Beatles" in their media consumption histories, the rank scores associated with knowledge elements that include information relating to "The Beatles" can be assigned and/or increased, e.g., to indicate that "The Beatles" are likely an entity similar to "The Rolling Stones."

In some implementations, rank scores associated with knowledge elements can be assigned and/or adjusted based on determining an age group or suitability rating associated with the user 604 and/or knowledge elements related to a referenced entity. For example, the query engine front-end 620 can determine an age group of the user 604 based on a previous search history of the user 604, based on an account or profile of the user 604, based on parental controls associated with a web browser or other application used by the user 604, or based on other information. The query engine front-end 620 and/or the knowledge engine 650 may also determine a suitability rating associated with knowledge elements related to the referenced entity, e.g., based on identifying a suitability rating assigned to information associated with the knowledge element or based on performing other analysis, e.g., crawling the information associated with the knowledge element. Based on the determine age group of the user 604 and/or the suitability rating associated with a knowledge element, a rank score associated with the knowledge element can be assigned and/or adjusted.

In some implementations, interests of the user 604 can be identified, and rank scores associated with knowledge elements can be assigned and/or adjusted based on the interests of the user 604. In some implementations, a history of interactions of the user 604 with knowledge cards and/or with information included in knowledge cards, such as the user's selection of links included in the knowledge cards, can be determined, and rank scores associated with knowledge elements can be assigned and/or adjusted based on the interaction history of the user 604. In practice, other factors can be additionally or alternatively be considered in assigning and/or adjusting rank scores associated with knowledge elements, to enable the system 600 to provide relevant knowledge cards to user in response to user-input queries.

In addition to assigning and/or adjusting rank scores associated with knowledge elements, the query engine front-end 620 can determine other parameters related to presenting knowledge cards in response to user-input queries. For example, knowledge cards may be provided for display to users within search results pages, and the query engine front-end 620 can determine the placement of a knowledge card among one or more other web search results within the search results page. For instance, a determination may be made to present the knowledge card at the top of a search results page, e.g., before the listing of search results, or may be presented at a different location within the search results page, e.g., below the listing of search results, in the middle of the listing of search results, in a side panel beside the listing of search results, in a popup window within a search results page, or in another location such as in a separate web browser window or in a separate tab of a web browser.

In some implementations, the query engine front-end 620 can determine an order of knowledge elements to present in a knowledge card. For example, a knowledge card can be configured to present selected knowledge elements in a particular order, e.g., such that knowledge elements that are identified as being the most relevant to the user 604 or the most closely related to the referenced entity are presented first in the knowledge card, with less relevant knowledge elements or elements that are not as related to the referenced entity being displayed further down in a listing of knowledge elements within the knowledge card.

In some implementations, the query engine front-end 620 can determine to adjust other parameters relating to the presentation of knowledge elements within a knowledge card, such as an amount of information to include in the knowledge card, the types of information to present in the knowledge card, or whether to display a knowledge card or forgo displaying a knowledge card.

Knowledge elements can be selected for presentation in a knowledge card, and parameters relating to the presentation of the knowledge card can be determined based at least on the assigned or adjusted rank scores associated with the knowledge elements. For example, as described, particular knowledge elements can be selected for inclusion in a knowledge card based on the particular knowledge elements having the highest rank scores of the knowledge elements identified by the knowledge engine 650. In some instances, the particular knowledge elements can be selected based on the knowledge elements being associated with rank scores that satisfy a particular threshold, being associated with rank scores that satisfy a particular range of rank scores, or can be selected based on other factors.

In other examples, the position of a knowledge card within a search results page can be dependent on the rank scores of one or more knowledge elements, such as the rank scores of knowledge elements selected for presentation in a knowledge card. For instance, the query engine front-end 620 can determine to present a knowledge card at the top of a search results page, e.g., before a listing of search results, or in the middle of a search results page, e.g., in the middle of a listing of search results, based on the rank scores of the knowledge elements included in the listing of search results. In another example, a number of knowledge elements to include in a knowledge card can be determined based on determining a number of knowledge elements having rank scores that satisfy a rank score threshold. For instance, based on determining that only three knowledge elements are associated with rank scores that satisfy the threshold, only those three knowledge elements are presented in the knowledge card, while if it is determined that five knowledge elements are associated with rank scores that satisfy the threshold, all five of the knowledge elements may be presented in the knowledge card.

In some instances, rank scores associated with knowledge elements can consider all of the factors described, a subset of the factors described, or different factors, and selecting particular knowledge elements in a knowledge card can involve selecting the knowledge elements based on the rank scores associated with the knowledge elements and other factors. For example, rank scores associated with knowledge elements may not be assigned or adjusted based on a level of familiarity of the user 604 with the referenced entity, but selecting knowledge elements for inclusion in a knowledge card may consider the rank scores of the knowledge elements and, additionally, the level of familiarity of the user with the referenced entity.

Similarly, in some implementations, parameters associated with the presentation of knowledge cards can be determined based on rank scores associated with knowledge elements in addition to other factors. For example, rank scores associated with knowledge elements may not be assigned or adjusted based on a level of familiarity of the user 604 with the referenced entity. However, determining whether to provide a knowledge card may consider the level of familiarity of the user 604 with the entity, alternatively or in addition to considering the rank scores of the knowledge elements. For instance, if the user 604 is determined to have a low level of familiarity with "The Rolling Stones," then the query engine front-end 620 may determine to output a knowledge card to the user 604, while if the user 604 is determined to have a high level of familiarity with "The Rolling Stones," then the query engine front-end 620 may determine to forgo outputting a knowledge card to the user 604.

Based on selecting knowledge elements to include in a knowledge card, and alternatively determining parameters relating to the presentation of a knowledge card, the query engine front-end 620 can transmit information associated with the presentation of the knowledge card to the client device 602 during operation (I). In some implementations, the query engine front-end 620 can transmit data associated with the one or more selected knowledge elements and data relating to the presentation of the knowledge card to the client device over one or more networks, or wired or wireless connections.

The client device 602 can receive the data associated with presenting a knowledge card from the query engine front-end 620, and provide for output to the user 604 a knowledge card that includes the selected knowledge elements. In some implementations, the client device 602 can receive information defining one or more parameters associated with the presentation of a knowledge card, and can provide the knowledge card for output to the user 602 such that the knowledge card is displayed to the user according to the parameters.

In some implementations, the knowledge card can be placed within a search results page that includes one or more search results that are relevant to the user-input query. For example, the client device 602 can display the user interface 606. The user interface 606 can be a search results page, where the user interface 606 includes a query entry field 608, a knowledge card 610, and one or more search results 612. As shown, for example, the user interface 606 can display the knowledge card 610 at the top of a search results page, e.g., above the listing of one or more search results 612. As shown in FIG. 6, in response to receiving the user-input query "The Rolling Stones," the client device 602, the client device 602 has presented the knowledge card 610 that includes an image of the band "The Rolling Stones," and that includes information identifying an upcoming concert that features "The Rolling Stones," as well as information identifying the members of "The Rolling Stones."

As described, the user interface 606 presented to the user 604 can include one or more search results that are relevant to the user-input query. For instance, based on the user 604 providing the query "The Rolling Stones," one or more search results 612 can be identified, and the one or more search results 612 can be presented in the user interface 606 presented to the user 604. The search results 612 identified in response to the query "The Rolling Stones" can be the same search results regardless of the media consumption histories of the user 604 and other users that provide the query "The Rolling Stones," or the identified search results can be dependent upon the items identified in the media consumption histories of the user 604 and the other users. In some instances, the search results identified can depend upon the knowledge elements presented in the knowledge card 610. Search results can be determined based on submitting the user-input query to a search engine, and identifying or receiving one or more search results from the search engine, e.g., from a server associated with the search engine.

In some implementations, search results can be identified and can be transmitted to the client device 602. The client device 602 can receive the information identifying the search results and the data associated with presenting a knowledge card and can configure a user interface to display both the search results and the knowledge card. In other implementations, information associated with identified search results can be transmitted to the query engine front-end 620, and the query engine front-end 620 can transmit data to the client device 602 that includes information associated with presenting a knowledge card and associated with the search results. The client device 602 can receive the information from the query engine front-end 620, and can provide the knowledge card and the search results to the user 604 according to parameters associated with the presentation of the knowledge card. In still other implementations, the query engine front-end 620 can transmit the information associated with presenting the knowledge card to a search engine, and the search engine can transmit data to the client device 602 that includes the information associated with presenting the knowledge card as well as information associated with one or more search results.

Figure 7:
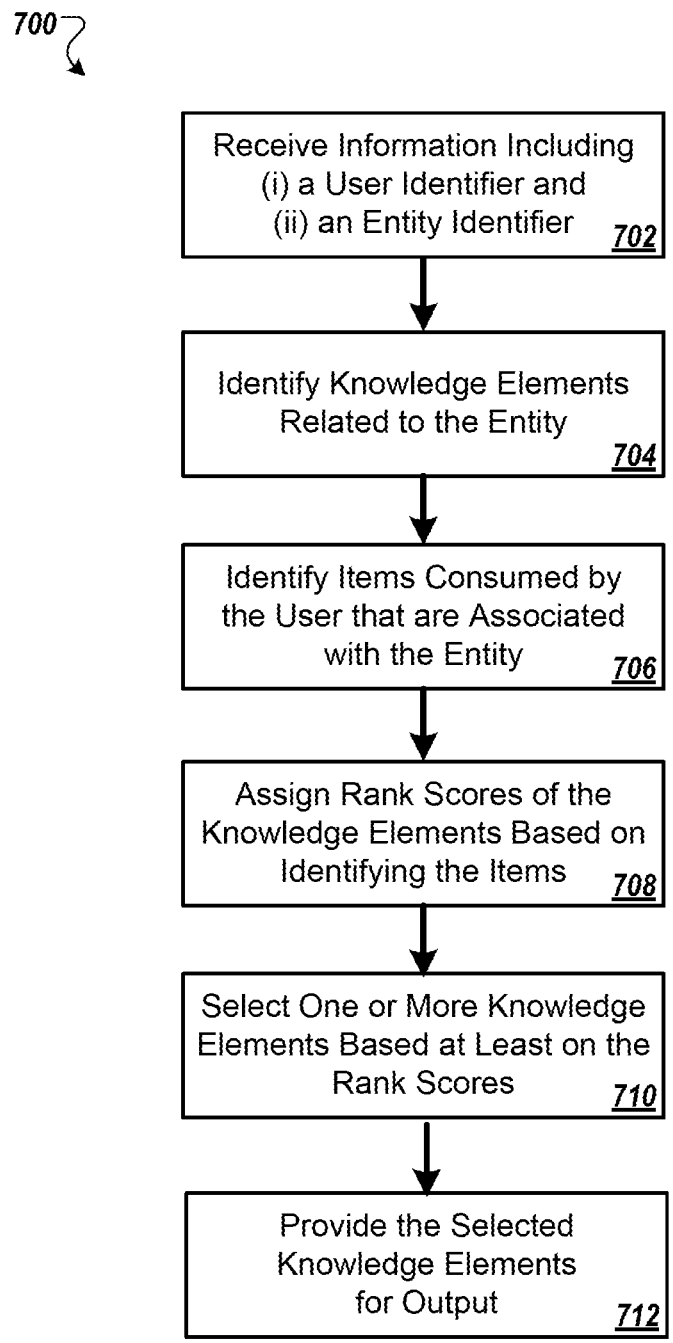
FIG. 7 depicts a flowchart of an example process for providing knowledge cards based on a media consumption history.

FIG. 7 presents an example process 700 for providing knowledge cards based on a media consumption history. For example, the process 700 can be performed by the system 600 in response to receiving a query input by a user 604.

At step 702, information is received that identifies an entity and that identifies a user. In some instances, the information can be received as a request associated with a search query that has been submitted by a user. For example, the query engine front-end 620 can receive data that identifies the user 604 and data that identifies an entity referenced by a query input by the user 604. In some instances, the query engine front-end 620 can receive data encoding a user-input query from a client device 602, and can transmit the data encoding the user-input query to the entity recognition engine 640. The entity referenced by the query can be identified by the entity recognition engine 640, and the entity recognition engine 640 can transmit data to the query engine front-end 620 that includes an identifier for the entity. In other implementations, the data received by the query engine front-end 620 can identify both the user 604 and the entity. For example, the query engine front-end 620 can receive data from the client device 202 that includes an identifier that uniquely identifies the user 604, and that further includes an identifier that uniquely identifies an entity referenced by the user-input query. The query engine front-end 620 can receive the data that identifies the entity referenced by the user-input query and the data identifying the user 604 over one or more networks, or wired or wireless connections.

At step 704, knowledge elements related to the entity are identified. For example, the query engine front-end 620 can receive data identifying an entity referenced by the user-input query, and can identify knowledge elements that are related to the entity. In some implementations, the query engine front-end 620 can identify knowledge elements related to the entity by transmitting data identifying the entity to the knowledge engine 650, and receiving data from the knowledge engine 650 that includes or identifies knowledge elements related to the entity. In some instances, the query engine front-end 620 can send data identifying the entity and receive data associated with knowledge elements that relate to the entity from the knowledge engine 650 over one or more networks, or wired or wireless connections.

At step 706, items are identified that have been consumed by the user 604 and that are associated with the entity referenced by the user-input query. For example, the query engine front-end 620 can transmit data to the content consumption engine 630 that identifies the entity referenced by the user-input query, and the query engine front-end 620 can receive data from the content consumption engine 630 that identifies one or more items that have been indicated as consumed by the user 604 and that are associated with the entity. In some implementations, the query engine front-end 620 can communicate with the content consumption engine 630 over one or more networks, or wired or wireless connections.

At step 708, rank scores associated with the knowledge elements are assigned based on identifying the items that have been consumed by the user and that are associated with the entity referenced by the user-input query. For example, the query engine front-end 620 can receive knowledge elements related to the referenced entity from the knowledge engine 650 and can receive data from the content consumption engine 630 that identifies items that have been consumed by the user and that are associated with the entity. Rank scores associated with the knowledge elements can be assigned and/or adjusted based on identifying the items, for example, by using the processes described with respect to operation (H) of FIG. 6. In some implementations, the query engine front-end 620 can receive the knowledge elements and the data identifying the items consumed by the user that are related to the referenced entity over one or more networks, or wired or wireless connections.

At step 710, one or more knowledge elements are selected to be included in a knowledge card, where selection of the knowledge elements is based at least on the rank scores assigned to the knowledge elements. For example, the query engine front-end 620 can select, based on the rank scores assigned to the knowledge elements, one or more of the knowledge elements to include in a knowledge card, where the knowledge card can be presented to the user 604 in response to receiving the user-input query. For instance, the query engine front-end 620 can select a certain number of knowledge elements that are associated with the highest rank scores, can select knowledge elements associated with rank scores that satisfy a particular threshold, or can select knowledge elements associated with rank scores that satisfy one or more other criteria. In some implementations, other data associated with the knowledge elements can be considered when selecting the knowledge elements to present in a knowledge card. For example, a knowledge element may be selected based on how recent it is, how popular it is, or how important it is determined to be, e.g., based on a number of links associated with the knowledge element, in addition to selecting the knowledge element based on its assigned rank score.

At step 712, the selected knowledge elements are provided for output, where the selected knowledge elements are presented in a knowledge card. For example, the query engine front-end 620 can transmit data to the client device 202, or to another system, e.g., a search engine, that causes the selected knowledge elements to be included in a knowledge card and provided for output to the user 604. In some implementations, the knowledge card can be presented within a search results page that includes one or more search results that are relevant to the user-input query. The query engine front-end 620 can transmit the data related to providing the knowledge card that includes the selected knowledge elements over one or more networks, or wired or wireless connections.

FIGS. 8A to 8D illustrate example user interfaces 800, 820, 840, 860 that present knowledge cards based on a media consumption history. In some implementations, the user interfaces 800, 820, 840, 860 can be presented to users in response to a user-input query. In some implementations, the user interfaces 800, 820, 840, 860 can be presented in a web browser or other application that is capable of providing users with a query feature, e.g., in search results page provided by a search engine that is accessible to users via a web browser.

The user interface 800 depicted in FIG. 8A is a representative user interface for displaying knowledge cards in response to a query input by a user. In some implementations, the user interface 800 can be presented to a user in response to the user providing a query at a search engine or other system that enables users to provide requests for information. Briefly, the user interface 800 includes a query entry field 802, a query request control 804, a knowledge card 810, and search results 815.

The user interface 800 can be presented in response to a query input by a user, such as the query "The Rolling Stones." For example, as shown in FIG. 8A, a user has input the query "The Rolling Stones" at the query entry field 802, and the user interface 800 can be presented to the user in response to the user selecting the query request control 804. The user interface 800 can be a representative user interface for displaying a knowledge card and search results in response to the user query. For instance, the user interface 800 can be presented to a user who is not associated with a media consumption history, can be presented to a user who is associated with a media consumption history that does not identify any items that are associated with the entity "The Rolling Stones," or can represent a default user interface presented in response to receiving a request for information relating to "The Rolling Stones."

The user interface 800 presented in response to the user-input query can include a knowledge card 810 that presents information relating to the band "The Rolling Stones." As shown, the knowledge card 810 identifies the members of "The Rolling Stones," e.g., "Mick Jagger," "Keith Richards," "Ronnie Wood," and "Charlie Watts," includes a biography of "The Rolling Stones," e.g., the excerpt of the biography describing that, "The Rolling Stones are an English rock band formed in . . . ," where the user has an option to view more of the biography, and includes information identifying upcoming concerts that feature "The Rolling Stones," e.g., at the "Greek Theatre" in California on November $8^{th}$ and at "Red Rocks Amphitheatre" in Colorado on December $1^{st}$, songs by "The Rolling Stones," e.g., the songs "Gimme Shelter," "Satisfaction," and "Angie," and albums by "The Rolling Stones," e.g., "Beggars Banquet," "Let It Bleed," and "Sticky Fingers."

The user interface 800 additionally presents search results 815 that are relevant to the query "The Rolling Stones." For example, as shown in FIG. 8A, the search results 815 include results for an official website of "The Rolling Stones," e.g., "www.rollingstones.com," an online encyclopedia entry for "The Rolling Stones," e.g., a Wikipedia article for "The Rolling Stones," and a website that includes a discography of the band "The Rolling Stones."

The user interface 820 depicted in FIG. 8B presents an alternative user interface that includes a knowledge card that can be presented to a user in response to receiving a query for "The Rolling Stones." For example, the user interface 820 can be presented to a user who is identified as having consumed multiple items associated with "The Rolling Stones," e.g., a user that is identified as having a medium level of familiarity with the band "The Rolling Stones." Similarly to the user interface 800, the user interface 820 includes a query entry field 822, a query request control 824, a knowledge card 830, and search results 835.

As shown in the user interface 820, the knowledge card 830 included in the user interface 820 includes different information than the knowledge card 810 that is included in the representative user interface 800. The information included in the knowledge card 830 has been selected for inclusion in the knowledge card 830 based on identifying one or more items that are associated with "The Rolling Stones" at a media consumption history of the user that provided the query. Additionally, the knowledge card 830 is presented amidst the listing of search results 835, as opposed to being presented above the search results 815 in user interface 800.

As shown in FIG. 8B, the knowledge card 820 identifies awards that have been granted to "The Rolling Stones," e.g., a "Grammy Award for Best Music Video," a "Grammy Award for Best Rock Album," and an option "MORE" that enables the user to view other awards, includes information identifying upcoming concerts that feature "The Rolling Stones," e.g., at the "Greek Theatre" in California on November $8^{th}$ and at "Red Rocks Amphitheatre" in Colorado on December $1^{st}$, includes information identifying record labels associated with "The Rolling Stones," e.g., "Virgin Records," "Atlantic Records," and "Columbia," and includes information identifying other artists that are similar to "The Rolling Stones," e.g., "Led Zeppelin," "The Beatles," and "The Who."

The user interface 820 further includes search results 835, where the search results 835 included in the user interface 820 are the same as the search results 815 included in the representative user interface 800. Specifically, as shown in FIG. 8B, the search results 835 include results for an official website of "The Rolling Stones," e.g., "www.rollingstones.com," an online encyclopedia entry for "The Rolling Stones," e.g., a Wikipedia article for "The Rolling Stones," and a website that includes a discography of the band "The Rolling Stones."

The user interface 840 depicted in FIG. 8C presents another alternative user interface that includes a knowledge card and that can be presented to a user in response to receiving a query for "The Rolling Stones." For example, the user interface 840 can be presented to a user who is identified as having consumed a large number of items associated with "The Rolling Stones," e.g., a user that is identified as having a high level of familiarity with the band "The Rolling Stones," or that has attended a number of concerts that featured "The Rolling Stones." Similarly to the user interface 800, the user interface 840 includes a query entry field 842, a query request control 844, a knowledge card 850, and search results 855.

As shown in the user interface 840, the knowledge card 850 included in the user interface 850 includes additional information compared to the knowledge card 810, as well as different information than the knowledge card 810. The information included in the knowledge card 850 has been selected for inclusion in the knowledge card 850 based on identifying items that are associated with "The Rolling Stones" at a media consumption history of the user that provided the query.

As shown in FIG. 8C, the knowledge card 850 identifies the members of "The Rolling Stones," e.g., "Mick Jagger," "Keith Richards," "Ronnie Wood," and "Charlie Watts," includes a biography of "The Rolling Stones," e.g., the excerpt of the biography describing that "The Rolling Stones are an English rock band formed in . . . ," where the user has an option to view more of the biography, includes information identifying upcoming concerts that feature "The Rolling Stones," e.g., at the "Greek Theatre" on November $8^{th}$, at "Red Rocks Amphitheatre" on December $1^{st}$, at "Madison Square Garden" on December $31^{st}$, and at the "Verizon Center" on January $3^{rd}$, includes information associated with recent posts relating to "The Rolling Stones," e.g., the posts having displayed excerpts such as "We are excited to announce that we will be touring in . . . ," and "Thanks to all of our fans who came out to see us last . . . ," includes information identifying awards received by "The Rolling Stones," e.g., a "Grammy Award for Best Music Video," a "Grammy Award for Best Rock Album," and a "Grammy Lifetime Achievement Award," and includes information identifying artists that are identified as being similar to "The Rolling Stones," e.g., the artists, "Led Zeppelin," "Bob Dylan," "The Beatles," "The Who," "The Kinks," "Jimi Hendrix," "The Doors," "Eric Clapton," and others.

The user interface 840 further includes search results 855, where the search results 855 included in the user interface 840 include some of the same search results 815 presented in the representative user interface 800. Specifically, as shown in FIG. 8C, the search results 855 include results for an official website of "The Rolling Stones," e.g., "www.rollingstones.com," and an online encyclopedia entry for "The Rolling Stones," e.g., a Wikipedia article for "The Rolling Stones."

The user interface 860 depicted in FIG. 8D presents another alternative user interface that can be presented in response to receiving a query for "The Rolling Stones." Similarly to the representative user interface 800, the user interface 860 includes a query entry field 862, a query request control 844, and search results 875, however, the user interface 860 does not include a knowledge card similar to the knowledge card 810. In some examples, the user interface 860 can be presented such that it does not include a knowledge card in response to determining that, for example, the user is identified as having a very high familiarity with "The Rolling Stones," or based on determining that none of the identified knowledge elements related to "The Rolling Stones" are associated with rank scores satisfying a rank score threshold.

The user interface 860 includes search results 875, where the search results 875 included in the user interface 860 include the same search results 815 presented in the representative user interface 800, in addition to other search results not presented in the user interface 800. Specifically, as shown in FIG. 8D, the search results 875 include results for an official website of "The Rolling Stones," e.g., the website "www.rollingstones.com," an online encyclopedia entry for "The Rolling Stones," e.g., a Wikipedia article for "The Rolling Stones," a website that includes a discography of the band "The Rolling Stones," a video channel associated with "The Rolling Stones," e.g., a YouTube page associated with "The Rolling Stones," a link for "Rolling Stone Magazine," a social network page associated with "The Rolling Stones," e.g., a Facebook page for "The Rolling Stones," and a website for a fan club of "The Rolling Stones."

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A method implemented by one or more processors, the method comprising:
   receiving a request at a request time that indicates (i) a user that submitted a search query, and (ii) an entity that is referenced by the search query;
   identifying (i) one or more items that have been indicated as consumed by the user and that are associated with the entity that is referenced by the search query, and (ii) for each item, a time of when the user consumed the item;
   determining, based at least on (i) identifying the one or more items that have been indicated as consumed by the user and that are associated with the entity that is referenced by the search query, and (ii) for each item, the time the user consumed the item, a level of familiarity of the user with the entity;

in response to determining the level of familiarity of the user with the entity is a first level of familiarity:
  selecting, based on first rank scores for a plurality of knowledge elements that are related to the entity that is referenced by the search query, a first subset of one or more knowledge elements to include in a knowledge card that is to be presented in a search results page in response to the request,
    the first rank scores being determined based on the level of familiarity of the user with the entity being the first level of familiarity, and
    the first subset of the one or more knowledge elements being selected based at least on the first rank scores, for the one or more knowledge elements selected for inclusion in the first subset, satisfying a threshold;

in response to determining the level of familiarity of the user with the entity is a second level of familiarity that differs from the first level of familiarity:
  selecting, based on second rank scores for the plurality of knowledge elements that are related to the entity that is referenced by the search query, a second subset of one or more additional knowledge elements to include in the knowledge card that is to be presented in the search results page in response to the request,
    the second rank scores being determined based on the level of familiarity of the user with the entity being the second level of familiarity, and
    the second subset of one or more additional knowledge elements being selected based at least on the second rank scores, for the one or more knowledge elements selected for inclusion in the second subset, satisfying the threshold or an additional threshold, and
    at least one knowledge element, included in the second subset of the one or more additional knowledge elements, differing from another knowledge element, included in the first subset of the one or more knowledge elements; and providing, in response to the request, data that causes the knowledge card, including the one or more knowledge elements, to be presented within the search results page.

2. The method according to claim 1, further comprising:
identifying, for each item of the one or more items, a prominence of the entity in the item,
  wherein determining the level of familiarity of the user with the entity is further based on, for each item, the prominence of the entity in the item.

3. The method according to claim 1, further comprising:
identifying the plurality of knowledge elements that are related to the entity that is referenced by the search query; and
assigning, based on the level of familiarity of the user with the entity, a corresponding rank score to each of the plurality of knowledge elements.

4. The method according to claim 1, further comprising:
identifying one or more search results that are determined to be responsive to the search query; and
providing, in response to the request, data that causes the one or more search results that are determined to be responsive to the search query to be presented within the search results page such that a position of the one or more search results that are determined to be responsive to the search query does not overlap with a position of the knowledge card presented within the search results page.

5. The method according to claim 1, wherein a position of the knowledge card presented within the search results page is a position that is above a position of a listing of search results that are determined to be responsive to the search query and that are presented within the search results page.

6. The method according to claim 1, wherein a position of the knowledge card presented within the search results page is a position that is below a position of one or more search results that are determined to be responsive to the search query that are presented within the search results page.

7. The method according to claim 1, wherein a position of the knowledge card presented within the search results page is a position that is beside a listing of one or more search results that are determined to be responsive to the search query that are presented within the search results page.

8. The method according to claim 1, wherein determining the level of familiarity of the user with the entity is further based on a count of the one or more items that have been indicated as consumed by the user and that are associated with the entity that is referenced by the search query.

9. The method according to claim 1, wherein determining the level of familiarity of the user with the entity is further based on an elapsed time between a first time and a most recent consumption time of one of the one or more items that have been indicated as consumed by the user and that are associated with the entity that is referenced by the search query.

10. A computer program product comprising one or more non-transitory computer-readable storage media having program instructions collectively stored on the one or more non-transitory computer-readable storage media, the program instructions executable to:
  receive a request at a request time that indicates (i) a user that submitted a search query, and (ii) an entity that is referenced by the search query;
  identify (i) one or more items that have been indicated as consumed by the user and that are associated with the entity that is referenced by the search query, and (ii) for each item, a time of when the user consumed the item;
  determine, based at least on (i) identifying the one or more items that have been indicated as consumed by the user and that are associated with the entity that is referenced by the search query, and (ii) for each item, the time the user consumed the item, a level of familiarity of the user with the entity;
  in response to determining the level of familiarity of the user with the entity is a first level of familiarity:
    select, based on first rank scores for a plurality of knowledge elements that are related to the entity that is referenced by the search query, a first subset of one or more knowledge elements to include in a knowledge card that is to be presented in a search results page in response to the request,
      the first rank scores being determined based on the level of familiarity of the user with the entity being the first level of familiarity, and
      the first subset of the one or more knowledge elements being selected based at least on the first rank scores, for the one or more knowledge elements selected for inclusion in the first subset, satisfying a threshold;

in response to determining the level of familiarity of the user with the entity is a second level of familiarity that differs from the first level of familiarity:
  select, based on second rank scores for the plurality of knowledge elements that are related to the entity that is referenced by the search query, a second subset of one or more additional knowledge elements to include in the knowledge card that is to be presented in the search results page in response to the request,
    the second rank scores being determined based on the level of familiarity of the user with the entity being the second level of familiarity, and
    the second subset of one or more additional knowledge elements being selected based at least on the second rank scores, for the one or more knowledge elements selected for inclusion in the second subset, satisfying the threshold or an additional threshold, and
    at least one knowledge element, included in the second subset of the one or more additional knowledge elements, differing from another knowledge element, included in the first subset of the one or more knowledge elements; and
  provide, in response to the request, data that causes the knowledge card, including the one or more knowledge elements, to be presented within the search results page.

11. The computer program product according to claim 10, wherein:
  the program instructions are further executable to identify, for each item of the one or more items, a prominence of the entity in the item; and
  determining the level of familiarity of the user with the entity is further based on, for each item, the prominence of the entity in the item.

12. The computer program product according to claim 10, wherein the program instructions are further executable to:
  identify the plurality of knowledge elements that are related to the entity that is referenced by the search query; and
  assign, based on the level of familiarity of the user with the entity, a corresponding rank score to each of the plurality of knowledge elements.

13. The computer program product according to claim 10, wherein the program instructions are further executable to:
  identify one or more search results that are determined to be responsive to the search query; and
  provide, in response to the request, data that causes the one or more search results that are determined to be responsive to the search query to be presented within the search results page such that a position of the one or more search results that are determined to be responsive to the search query does not overlap with a position of the knowledge card presented within the search results page.

14. The computer program product according to claim 10, wherein a position of the knowledge card presented within the search results page is a position that is above a position of a listing of search results that are determined to be responsive to the search query and that are presented within the search results page.

15. The computer program product according to claim 10, wherein a position of the knowledge card presented within the search results page is a position that is below a position of one or more search results that are determined to be responsive to the search query that are presented within the search results page.

16. The computer program product according to claim 10, wherein a position of the knowledge card presented within the search results page is a position that is beside a listing of one or more search results that are determined to be responsive to the search query that are presented within the search results page.

17. The computer program product according to claim 10, wherein determining the level of familiarity of the user with the entity is further based on a count of the one or more items that have been indicated as consumed by the user and that are associated with the entity that is referenced by the search query.

18. The computer program product according to claim 10, wherein determining the level of familiarity of the user with the entity is further based on an elapsed time between a first time and a most recent consumption time of one of the one or more items that have been indicated as consumed by the user and that are associated with the entity that is referenced by the search query.

19. A system comprising:
  a processor, a computer-readable memory, one or more computer-readable storage media, and program instructions collectively stored on the one or more computer-readable storage media, the program instructions executable to:
  receive a request at a request time that indicates (i) a user that submitted a search query, and (ii) an entity that is referenced by the search query;
  identify (i) one or more items that have been indicated as consumed by the user and that are associated with the entity that is referenced by the search query, and (ii) for each item, a time of when the user consumed the item;
  determine, based at least on (i) identifying the one or more items that have been indicated as consumed by the user and that are associated with the entity that is referenced by the search query, and (ii) for each item, the time the user consumed the item, a level of familiarity of the user with the entity;
  in response to determining the level of familiarity of the user with the entity is a first level of familiarity:
  select, based on first rank scores for a plurality of knowledge elements that are related to the entity that is referenced by the search query, a first subset of one or more knowledge elements to include in a knowledge card that is to be presented in a search results page in response to the request,
    the first rank scores being determined based on the level of familiarity of the user with the entity being the first level of familiarity, and
    the first subset of the one or more knowledge elements being selected based at least on the first rank scores, for the one or more knowledge elements selected for inclusion in the first subset, satisfying a threshold;
  in response to determining the level of familiarity of the user with the entity is a second level of familiarity that differs from the first level of familiarity:
  select, based on second rank scores for the plurality of knowledge elements that are related to the entity that is referenced by the search query, a second subset of one or more additional knowledge elements to include in the knowledge card that is to be presented in the search results page in response to the request,
    the second rank scores being determined based on the level of familiarity of the user with the entity being the second level of familiarity, and
    the second subset of one or more additional knowledge elements being selected based at least on the second rank scores, for the one or more knowledge elements selected for inclusion in the second subset, satisfying the threshold or an additional threshold, and at least one knowledge element, included in the second subset of the one or more additional knowledge elements, differing from another knowledge element, included in the first subset of the one or more knowledge elements; and provide, in response to the request, data that causes the knowledge card, including the one or more knowledge elements, to be presented within the search results page.

20. The system according to claim 19, wherein:

the program instructions are further executable to identify, for each item of the one or more items, a prominence of the entity in the item; and determining the level of familiarity of the user with the entity is further based on, for each item, the prominence of the entity in the item.

* * * * *